(12) United States Patent
Li et al.

(10) Patent No.: US 11,196,798 B2
(45) Date of Patent: Dec. 7, 2021

(54) METHOD FOR SHARING DATA IN LOCAL AREA NETWORK AND ELECTRONIC DEVICE

(71) Applicant: HUAWEI TECHNOLOGIES CO., LTD., Guangdong (CN)

(72) Inventors: Jiaxin Li, Shanghai (CN); Yaoying Zhou, Shanghai (CN); Yuanqiang Ni, Shanghai (CN); Jian Chen, Shanghai (CN); Meng Diao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/041,832

(22) PCT Filed: Mar. 27, 2018

(86) PCT No.: PCT/CN2018/080724
§ 371 (c)(1),
(2) Date: Sep. 25, 2020

(87) PCT Pub. No.: WO2019/183810
PCT Pub. Date: Oct. 3, 2019

(65) Prior Publication Data
US 2021/0029193 A1 Jan. 28, 2021

(51) Int. Cl.
*H04L 29/08* (2006.01)
*H04L 29/06* (2006.01)
(Continued)

(52) U.S. Cl.
CPC ............ *H04L 67/06* (2013.01); *H04L 63/083* (2013.01); *H04W 12/06* (2013.01); *H04W 80/12* (2013.01); *H04W 84/12* (2013.01)

(58) Field of Classification Search
CPC ...... H04L 67/06; H04L 63/083; H04W 12/06; H04W 80/12; H04W 84/12
See application file for complete search history.

(56) References Cited

U.S. PATENT DOCUMENTS 9,854,063 B2 * 12/2017 Borzycki ................. H04L 9/14
9,935,999 B1 * 4/2018 Hudgin .................. H04L 67/42
(Continued)

FOREIGN PATENT DOCUMENTS

| CN | 103324537 A | 9/2013 |
| CN | 106034139 A | 10/2016 |

(Continued)

*Primary Examiner* — Todd L Barker
(74) *Attorney, Agent, or Firm* — Womble Bond Dickinson (US) LLP

(57) ABSTRACT

Embodiments of this application disclose a method for sharing data in a local area network and an electronic device. The method is as follows: A first electronic device establishes a wireless connection to a wireless access point, and receives, from a first port, access request information of a second electronic device forwarded by using the wireless access point, where the first port is a serving port for a local area network shared access protocol, and the second electronic device also establishes a wireless connection the wireless access point; the first electronic device verifies validity of the second electronic device; and if succeeds, the first electronic device sends access response information to the second electronic device, so that shared data in the first electronic device is accessed from the second electronic device, where the access response information includes an internal storage directory and a common file directory.

13 Claims, 20 Drawing Sheets

(51) Int. Cl.
*H04W 12/06* (2021.01)
*H04W 80/12* (2009.01)
*H04W 84/12* (2009.01)

(56) References Cited

U.S. PATENT DOCUMENTS

| | | | | |
|---|---|---|---|---|
| 2002/0059451 | A1* | 5/2002 | Haviv | H04L 45/306 709/238 |
| 2004/0098383 | A1* | 5/2004 | Tabellion | G06F 16/11 |
| 2006/0026213 | A1* | 2/2006 | Yaskin | G09B 7/02 |
| 2008/0162707 | A1* | 7/2008 | Beck | H04L 69/28 709/229 |
| 2012/0011272 | A1* | 1/2012 | Tanigawa | H04L 67/06 709/236 |
| 2013/0117365 | A1* | 5/2013 | Padmanabhan | H04W 4/02 709/204 |
| 2013/0159429 | A1* | 6/2013 | Nalliah | H04L 51/14 709/206 |
| 2013/0218986 | A1* | 8/2013 | Sobhani | H04L 51/22 709/206 |
| 2013/0227082 | A1* | 8/2013 | Lin | H04L 67/06 709/219 |
| 2014/0033012 | A1* | 1/2014 | Dhillon | G06F 40/197 715/229 |
| 2014/0337734 | A1* | 11/2014 | Bradford | G09B 5/00 715/719 |
| 2015/0067715 | A1* | 3/2015 | Koat | H04H 60/15 725/25 |
| 2015/0089181 | A1 | 3/2015 | Tsao | |
| 2015/0113441 | A1* | 4/2015 | Felt | H04L 65/602 715/753 |
| 2015/0189118 | A1* | 7/2015 | Ogata | H04N 9/8042 348/231.3 |
| 2015/0193465 | A1* | 7/2015 | Schoeffler | G06F 3/04842 707/827 |
| 2016/0057201 | A1* | 2/2016 | Xu | H04L 67/10 709/219 |
| 2016/0173491 | A1* | 6/2016 | Moten | H04L 63/0846 726/4 |
| 2017/0099149 | A1* | 4/2017 | Eber | H04L 63/0428 |
| 2017/0161637 | A1* | 6/2017 | Misra | G06F 16/313 |
| 2017/0262157 | A1* | 9/2017 | Shem Tov | G06F 3/0486 |

FOREIGN PATENT DOCUMENTS

| | | |
|---|---|---|
| CN | 106789470 A | 5/2017 |
| CN | 106844104 A | 6/2017 |
| CN | 104301400 B | 10/2017 |
| CN | 107484169 A | 12/2017 |

* cited by examiner

METHOD FOR SHARING DATA IN LOCAL AREA NETWORK AND ELECTRONIC DEVICE

CROSS-REFERENCE TO RELATED APPLICATIONS

This application is a national stage of International Application No. PCT/CN2018/080724, filed on Mar. 27, 2018, which is herein incorporated by reference in its entirety.

TECHNICAL FIELD

Embodiments of this application relate to the terminal field, and in particular, to a method for sharing data in a local area network and an electronic device.

BACKGROUND

As terminal technologies continuously develop, mobile phones are increasingly popularized. Because storage space of a mobile phone is limited or it is inconvenient for a user to edit and manage data such as a photo or a file by using the mobile phone, the user usually needs to access data (such as a photo, a video, or a file) in the mobile phone by using a computer.

The prior art provides two solutions for accessing the data in the mobile phone by using the computer: Solution 1: The mobile phone is connected to the computer by using a universal serial bus (USB) cable. After the connection succeeds, the mobile phone is mapped as a storage device of the computer. In this way, the user can access the data stored in the mobile phone by using the computer. Solution 2: Corresponding mobile assistant software is installed on both the mobile phone and the computer, and the mobile phone and the computer may establish a connection by using the mobile assistant software. After the connection succeeds, the user can access, from the computer, the data stored in the mobile phone.

It can be learned that in the existing Solution 1, the data stored in the mobile phone can be accessed from the computer only by using the USB cable, and in the existing Solution 2, the data stored in the mobile phone can be accessed from the computer only by installing the corresponding software on both the mobile phone and the computer. In addition, when an operating system of the mobile phone is different from an operating system of the computer, even if the mobile phone is connected to the computer by using the USB cable, the data stored in the mobile phone cannot be accessed from the computer because the operating system of the computer is incompatible with that of the mobile phone. In this case, dedicated software needs to be installed on the computer. In conclusion, the data stored in the mobile phone cannot be quickly and conveniently accessed from the computer by using the existing two solutions.

SUMMARY

Embodiments of this application provide a method for sharing data in a local area network and an electronic device, to resolve a problem that data stored in a mobile phone cannot be quickly and conveniently accessed from a computer by using an existing solution.

To achieve the foregoing objective, the following technical solutions are used in the embodiments of this application:

According to a first aspect of the embodiments of this application, a method for sharing data in a local area network is provided, where the method is implemented on a first electronic device with a touchscreen, and the method may include:

establishing, by the first electronic device, a wireless connection to a wireless access point; receiving, by the first electronic device from a first port, access request information of a second electronic device forwarded by using the wireless access point, where the first port is a serving port for a local area network shared access protocol, and the second electronic device also establishes a wireless connection to the wireless access point; verifying, by the first electronic device, validity of the second electronic device based on the access request information; and if the first electronic device determines that the verification of the second electronic device succeeds, sending, by the first electronic device, access response information to the second electronic device by using the wireless access point, so that shared data in the first electronic device is accessed from the second electronic device, where the access response information includes an internal storage directory and a common file directory.

According to the method for sharing data in a local area network provided in this embodiment of this application, the first electronic device that supports the local area network shared access protocol receives an operation of enabling a data sharing function, and enables the data sharing function in response to the operation, where the data sharing function is mainly used for a user to access the shared data in the first electronic device from the second electronic device, and the second electronic device and the first electronic device are connected to a same local area network. In this way, there is no need to install any software on the first electronic device and the second electronic device, there is no need to connect the first electronic device and the second electronic device by using a USB cable, and the data stored in the first electronic device can be accessed quickly and conveniently from the second electronic device, provided that the first electronic device and the second electronic device are connected to the same local area network. In addition, both a Mac notebook computer of Apple and another Windows' notebook computer support the local area network shared access protocol. Therefore, even if an operating system of the first electronic device, for example, a mobile phone, is incompatible with an operating system of a notebook computer, data stored in the mobile phone can be accessed from the notebook computer by using the method in this application. In addition, the access response information including the internal storage directory and the common file directory is returned to the second electronic device. This can help the user quickly find a common file, and provide experience of operating a common folder for the user.

With reference to the first aspect, in an implementation, before the receiving, by the first electronic device from a first port, access request information of a second electronic device forwarded by using the wireless access point, the method may further include: receiving, by the first electronic device, first input; and enabling, by the first electronic device, a data sharing function in response to the first input.

With reference to the first aspect or the foregoing possible implementation, in another possible implementation, the receiving, by the first electronic device, first input may specifically include: displaying a share control screen on the touchscreen of the first electronic device, where the share control screen includes a share on/off button; and receiving, by the first electronic device, the first input for the share on/off button.

With reference to the first aspect or the foregoing possible implementations, in another possible implementation, the wireless access point is a Wi-Fi hotspot or a Bluetooth beacon; or the local area network file sharing protocol is the SMB protocol; or the first electronic device is a mobile phone, and the second electronic device is a computer; or the common file directory includes at least one of the following: an album directory, a music directory, and a video directory; or the first port is a transmission control protocol TCP port 139 or 445.

With reference to the first aspect or the foregoing possible implementations, in another possible implementation, after the establishing, by the first electronic device, a wireless connection to a wireless access point, the method may further include: disabling, by the first electronic device, the data sharing function when determining that the wireless connection between the first electronic device and the wireless access point is disconnected. When detecting that the first electronic device is disconnected from the wireless access point, the first electronic device automatically disables the data sharing function, thereby reducing power consumption of a terminal.

With reference to the first aspect or the foregoing possible implementations, in another possible implementation, after the establishing, by the first electronic device, a wireless connection to a wireless access point, the method may further include: when determining that the wireless connection between the first electronic device and the wireless access point is disconnected and that a wireless connection is established to another wireless access point, displaying, by the first electronic device, prompt information on the touchscreen of the first electronic device, where the prompt information is used to indicate that the first electronic device has established the wireless connection to the another wireless access point. In some embodiments, the first electronic device may further automatically disable the data sharing function. This can effectively prevent unauthorized access to the first electronic device by another electronic device connected to the new wireless access point, especially when the first electronic device allows password-free access.

According to a second aspect of the embodiments of this application, a method for sharing data in a local area network is provided, where the method may include:

establishing, by a first electronic device, a wireless connection to a Wi-Fi hotspot; establishing, by a second electronic device, a wireless connection to the Wi-Fi hotspot; receiving, by the second electronic device, second input; displaying an identifier of the first electronic device on the second electronic device in response to the second input, where the identifier of the first electronic device includes a device icon and a to-be-discovered share name; receiving, by the second electronic device, third input; displaying a verification window on the second electronic device in response to the third input, where the verification window is used to prompt a user to enter a user name and a password for login authentication; after receiving input confirmation, adding, by the second electronic device to access request information, the user name and the password that are entered by the user for login authentication, and sending the access request information to the first electronic device by using the Wi-Fi hotspot; receiving, by the first electronic device, the access request information from a first port, where the first port is a serving port for the SMB protocol; verifying, by the first electronic device, validity of the second electronic device based on the access request information; and if the first electronic device determines that the verification of the second electronic device succeeds, sending, by the first electronic device, access response information to the second electronic device by using the Wi-Fi hotspot, so that shared data in the first electronic device is accessed from the second electronic device, where the access response information includes an internal storage directory and a common file directory.

According to the method for sharing data in a local area network provided in this embodiment of this application, the first electronic device that supports a local area network shared access protocol receives an operation of enabling a data sharing function, and enables the data sharing function in response to the operation, where the data sharing function is mainly used for the user to access the shared data in the first electronic device from the second electronic device, and the second electronic device and the first electronic device are connected to a same local area network. In this way, there is no need to install any software on the first electronic device and the second electronic device, there is no need to connect the first electronic device and the second electronic device by using a USB cable, and the data stored in the first electronic device can be accessed quickly and conveniently from the second electronic device, provided that the first electronic device and the second electronic device are connected to the same local area network. In addition, both a Mac notebook computer of Apple and another Windows notebook computer support the local area network shared access protocol. Therefore, even if an operating system of the first electronic device, for example, a mobile phone, is incompatible with an operating system of a notebook computer, data stored in the mobile phone can be accessed from the notebook computer by using the method in this application. In addition, the access response information including the internal storage directory and the common file directory is returned to the second electronic device. This can help the user quickly find a common file, and provide experience of operating a common folder for the user.

With reference to the second aspect, in an implementation, before the receiving, by the second electronic device, second input, the method further includes: obtaining, by the first electronic device, a second user identifier of the second electronic device; determining, by the first electronic device, whether the second user identifier is the same as a first user identifier stored in the first electronic device; if the first electronic device determines that the second user identifier is the same as the first user identifier, automatically enabling, by the first electronic device, a data sharing function; and displaying, by the second electronic device, notification information, where the notification information indicates that the first electronic device has enabled the data sharing function. When determining that the second user identifier of the second electronic device is the same as the first user identifier stored in the first electronic device, the first electronic device automatically enables the data sharing function, thereby improving user experience.

With reference to the second aspect or the foregoing possible implementation, in another possible implementation, before the receiving, by the second electronic device, second input, the method may further include: receiving, by the first electronic device, first input; and enabling, by the first electronic device, the data sharing function in response to the first input.

With reference to the second aspect or the foregoing possible implementations, in another possible implementation, the identifier of the first electronic device and an identifier of a third electronic device are included in different directories in a network neighborhood of the second electronic device, and the third electronic device is a computer that has enabled a data sharing function. This can help the user differentiate a device type of a share server discovered by the second electronic device.

With reference to the second aspect or the foregoing possible implementations, in another possible implementation, the first port is a transmission control protocol TCP port 139 or 445; and the common file directory includes at least one of the following: an album directory, a music directory, and a video directory.

A third aspect of the embodiments of this application provides a system for sharing data in a local area network, where the system includes a first electronic device and a second electronic device, and the first electronic device is a mobile phone running an Android operating system;

the first electronic device and the second electronic device are connected to a same wireless access point; the first electronic device receives, from a first port, access request information of the second electronic device forwarded by using the wireless access point, where the first port is a serving port for a local area network shared access protocol; the first electronic device verifies validity of the second electronic device based on the access request information; and if the first electronic device determines that the verification of the second electronic device succeeds, the first electronic device sends access response information to the second electronic device by using the wireless access point, so that shared data in the first electronic device is accessed from the second electronic device, where the access response information includes an internal storage directory and a common file directory.

With reference to the third aspect, in an implementation, the second electronic device receives second input, and displays an identifier of the first electronic device on the second electronic device in response to the second input, where the identifier of the first electronic device includes a device icon and a to-be-discovered share name; the second electronic device receives third input, and displays a verification window on the second electronic device in response to the third input, where the verification window is used to prompt a user to enter a user name and a password for login authentication; and after receiving input confirmation, the second electronic device adds, to the access request information, the user name and the password that are entered by the user for login authentication, and sends the access request information to the first electronic device by using the Wi-Fi hotspot.

With reference to the third aspect or the foregoing possible implementation, in another possible implementation, the identifier of the first electronic device and an identifier of a third electronic device are included in different directories in a network neighborhood of the second electronic device, and the third electronic device is a computer that has enabled a data sharing function.

According to a fourth aspect of the embodiments of this application, a method for sharing data in a local area network is provided, where the method includes:

establishing, by a seconds electronic device, a wireless connection to a Wi-Fi hotspot; establishing, by a first electronic device, a wireless connection to the Wi-Fi hotspot; obtaining, by the first electronic device, a second user identifier of the second electronic device; determining, by the first electronic device, whether the second user identifier is the same as a first user identifier stored in the first electronic device; if the first electronic device determines that the second user identifier is the same as the first user identifier, automatically enabling, by the first electronic device, a data sharing function; displaying, by the second electronic device, notification information, where the notification information indicates that the first electronic device has enabled the data sharing function; receiving, by the second electronic device, second input; displaying an identifier of the first electronic device on the second electronic device in response to the second input, where the identifier of the first electronic device includes a device icon and a to-be-discovered share name; receiving, by the second electronic device, third input; displaying a verification window on the second electronic device in response to the third input, where the verification window is used to prompt a user to enter a user name and a password for login authentication; after receiving input confirmation, adding, by the second electronic device to access request information, the user name and the password that are entered by the user for login authentication, and sending the access request information to the first electronic device by using the Wi-Fi hotspot; receiving, by the first electronic device, the access request information from a first port, where the first port is a serving port for the server message block SMB protocol; verifying, by the first electronic device, validity of the second electronic device based on the access request information; and if the first electronic device determines that the verification of the second electronic device succeeds, sending, by the first electronic device, access response information to the second electronic device by using the Wi-Fi hotspot, so that shared data in the first electronic device is accessed from the second electronic device, where the access response information includes an internal storage directory and a common file directory.

According to a fifth aspect of the embodiments of this application, an electronic device is provided, where the electronic device may include:

a connection unit, configured to establish a wireless connection to a wireless access point; a receiving unit, configured to receive, from a first port, access request information of a second electronic device forwarded by using a wireless access point, where the first port is a serving port for a local area network shared access protocol, and the second electronic device establishes a wireless connection to the wireless access point; a verification unit, configured to verify validity of the second electronic device based on the access request information received by the receiving unit; and a sending unit, configured to: when the verification unit determines that the verification of the second electronic device succeeds, send access response information to the second electronic device by using the wireless access point, so that shared data in the first electronic device is accessed from the second electronic device, where the access response information includes an internal storage directory and a common file directory.

With reference to the fifth aspect, in an implementation, the electronic device may further include: an input unit, configured to receive first input; and a control unit, configured to enable a data sharing function in response to the first input received by the input unit.

With reference to the fifth aspect or the foregoing possible implementation, in another possible implementation, the electronic device may further include: a display unit, configured to display a share control screen, where the share control screen includes a share on/off button; and the input unit is specifically configured to receive the first input for the share on/off button.

With reference to the fifth aspect or the foregoing possible implementations, in another possible implementation, the wireless access point is a wireless fidelity Wi-Fi hotspot or a Bluetooth beacon; or the local area network file sharing protocol is the server message block SMB protocol; or the electronic device is a mobile phone, and the second electronic device is a computer; or the common file directory includes at least one of the following: an album directory, a music directory, and a video directory; or the first port is a transmission control protocol TCP port 139 or 445.

With reference to the fifth aspect or the foregoing possible implementations, in another possible implementation, the control unit is further configured to disable the data sharing function when it is determined that the wireless connection between the electronic device and the wireless access point is disconnected.

With reference to the fifth aspect or the foregoing possible implementations, in another possible implementation, the electronic device may further include: the display unit, configured to display prompt information when it is determined that the wireless connection between the electronic device and the wireless access point is disconnected and that a wireless connection is established to another wireless access point, where the prompt information is used to indicate that the electronic device establishes the wireless connection to the another wireless access point.

According to a sixth aspect of the embodiments of this application, an electronic device is provided, where the electronic device may include one or more processors, one or more memories, and a touchscreen; the one or more memories and the touchscreen are coupled to the one or more processors; the one or more memories are configured to store computer program code, and the computer program code includes a computer instruction; when the one or more processors execute the computer instruction, the electronic device performs the method for sharing data in a local area network in any one of the first aspect or the possible implementations of the first aspect; and the touchscreen is configured to display content according to an instruction of the processor.

According to a seventh aspect of the embodiments of this application, a computer storage medium is provided, including a computer instruction. When the computer instruction is run on an electronic device, the electronic device is enabled to perform the method for sharing data in a local area network in any one of the first aspect or the possible implementations of the first aspect.

According to an eighth aspect of the embodiments of this application, a computer program product is provided. When the computer program product is run on a computer, the computer is enabled to perform the method for sharing data in a local area network in any one of the first aspect or the possible implementations of the first aspect.

According to a ninth aspect of the embodiments of this application, a program orchestration apparatus is provided, where the apparatus has a function of implementing behavior of the electronic device in the foregoing method embodiments. The function may be implemented by hardware, or may be implemented by hardware executing corresponding software. The hardware or the software includes one or more modules corresponding to the foregoing function.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more than two.

An embodiment of this application provides a method for sharing data in a local area network. The method may be applied to an electronic device that supports a local area network shared access protocol. According to the method for sharing data in a local area network, there is no need to install any software on the electronic device and another electronic device, there is no need to connect the electronic device and the another electronic device by using a USB cable, and therefore data stored in the electronic device can be accessed quickly and conveniently from the another electronic device. The another electronic device may be a device serving as a share client to access the electronic device.

Figure 1:
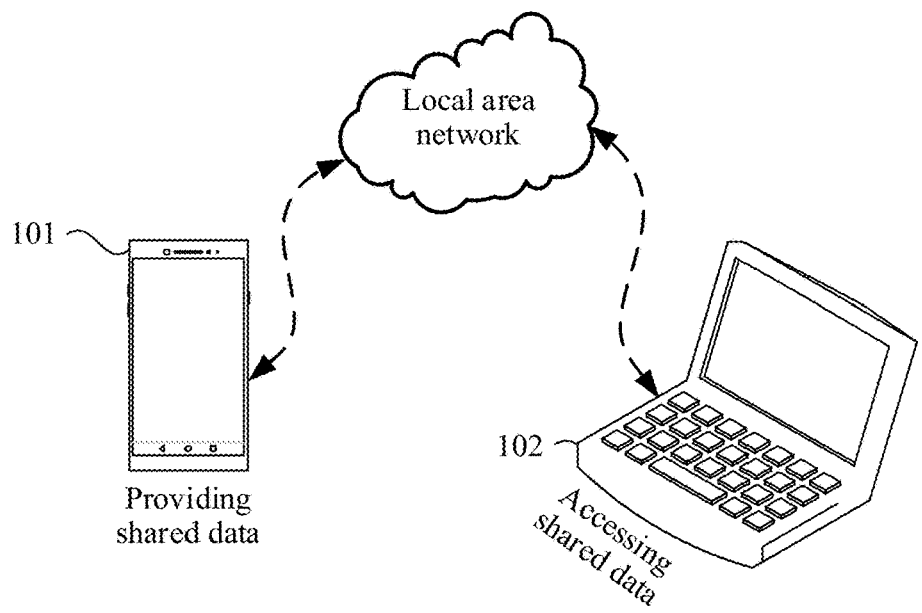
FIG. 1 is a simplified schematic diagram of a system architecture according to an embodiment of this application.

FIG. 1 is a simplified schematic diagram of a system architecture according to an embodiment of this application. As shown in FIG. 1, the system architecture may include a first electronic device 101 and a second electronic device 102. The first electronic device 101 and the second electronic device 102 are connected to a same local area network. That the first electronic device 101 and the second electronic device 102 are connected to a same local area network may be specifically that the first electronic device 101 and the second electronic device 102 establish wireless connections to a same wireless access point. For example, the first electronic device 101 and the second electronic device 102 are connected to a same wireless fidelity (WI-FI) hotspot. For another example, the first electronic device 101 and the second electronic device 102 may be connected to a same Bluetooth beacon by using a Bluetooth protocol.

Figure 2:
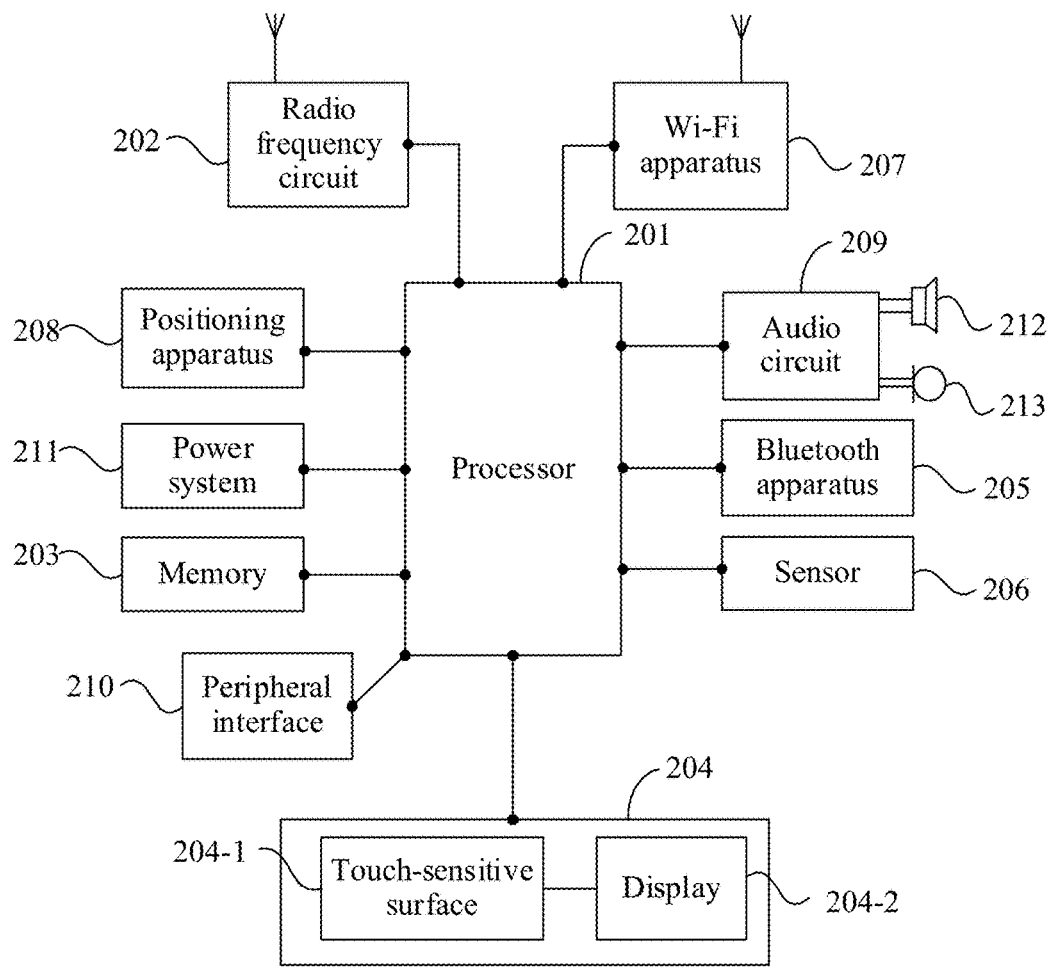
FIG. 2 is a schematic diagram of a hardware structure of a mobile phone according to an embodiment of this application.

The first electronic device 101 supports a local area network shared access protocol, and may serve as a share server to provide shared data. For example, the first electronic device 101 may be a mobile phone, a tablet computer, or the like. A specific structure of the first electronic device 101 is shown in FIG. 2, and is specifically described in the following embodiment.

The second electronic device 102 also supports the local area network shared access protocol, and may serve as a share client to access the shared data in the first electronic device 101. In some embodiments, the second electronic device 102 may be specifically a mobile phone or a computer. The computer may be a desktop computer, or may be a notebook computer, for example, a Mac notebook computer of Apple or a Windows notebook computer of Huawei.

In some embodiments of this application, the local area network shared access protocol may be the server message block (SMB) protocol. The SMB protocol is a communications protocol used for sharing resources such as a file and a printer on a local area network and providing services for sharing the resources such as a file and a printer between different computers on the local area network. The SMB protocol is a client/server and request/response protocol. By using the SMB protocol, a client may read and write a file in a server in various network environments, and send a service request to the server. In addition, the client may further access resources such as a file, a printer, a mailslot, and a named pipe on a remote server by using the SMB protocol. Specifically, in a TCP/IP environment, the client may establish a connection to the server by using NetBIOS over TCP/IP (or NetBEUI/TCP, or SPX/IPX). After the connection succeeds, the client may send an SMB command to the server, so that the client can access a shared directory, open a file, read and write a file, and perform all other operations that can be performed on a file system. In some other embodiments of this application, the local area network shared access protocol may alternatively be the common internet file system (CIFS) protocol. The CIFS protocol is a newly proposed protocol. The protocol is also a client/server and request/response protocol. The CIFS protocol is one version of the SMB protocol. Similar to the SMB protocol, the CIFS protocol runs at a higher layer and may be considered as an implementation of application protocols such as the file transfer protocol and the hypertext transfer protocol.

The following describes a first electronic device 101, a graphical user interface (which may be referred to as GUI for short below) on such a first electronic device 101, and an embodiment in which such a first electronic device 101 is used. In some embodiments of this application, the first electronic device 101 may be a portable electronic device, such as a mobile phone, a tablet computer, or a wearable device (for example, a smartwatch) with a wireless communication function, that further includes another function, for example, a personal digital assistant function and/or a music player function. An example embodiment of the portable electronic device includes but is not limited to a portable electronic device using iOS®, Android®, Microsoft®, or another operating system. The portable electronic device may also be another portable electronic device, for example, a laptop computer (Laptop) with a touch-sensitive surface (for example, a touch panel). It should be further understood that, in some other embodiments of this application, the first electronic device 101 may not be the portable electronic device, but a desktop computer or a digital camera with a touch-sensitive surface (for example, a touch panel).

As shown in FIG. 2, in an embodiment of this application, that a first electronic device 101 is a mobile phone is used as an example to describe the first electronic device 101 provided in this embodiment of this application. A person skilled in the art may understand that the mobile phone shown in FIG. 2 is merely an example, and does not constitute a limitation on the mobile phone. In addition, the mobile phone may have more or fewer components than those shown in the figure, or may combine two or more components, or may have different component configurations. The components shown in FIG. 2 may be implemented in hardware including one or more signal processing and/or application-specific integrated circuits, software, or a combination of hardware and software.

As shown in FIG. 2, the mobile phone may specifically include components such as a processor 201, a radio frequency (RF) circuit 202, a memory 203, a touchscreen 204, a Bluetooth apparatus 205, one or more sensors 206, a Wi-Fi apparatus 207, a positioning apparatus 208, an audio circuit 209, a peripheral interface 210, and a power system 211. These components may perform communication by using one or more communications buses or signal cables (not shown in FIG. 2).

The following describes the components of the mobile phone in detail with reference to FIG. 2.

The processor 201 is a control center of the mobile phone. The processor 201 is connected to parts of the mobile phone by using various interfaces and cables, runs or executes an application (App) stored in the memory 203, and invokes data and an instruction that are stored in the memory 203, to perform various functions of the mobile phone and process data. In some embodiments, the processor 201 may include one or more processing units. The processor 201 may further integrate an application processor and a modem processor. The application processor mainly processes an operating system, a user interface, an application, and the like. The modem processor mainly processes wireless communication. It should be understood that the modem processor may not be integrated into the processor 201. For example, the processor 201 may be a chip Kirin 960 manufactured by Huawei Technologies Co., Ltd. In some embodiments of this application, the processor 201 may further include a fingerprint verification chip, configured to verify a collected fingerprint.

The radio frequency circuit 202 may be configured to send and receive a radio signal in an information receiving and sending process or a call process. Particularly, after receiving downlink data from a base station, the radio frequency circuit 202 may send the downlink data to the processor 201 for processing. In addition, the radio frequency circuit 202 sends related uplink data to the base station. Generally, the radio frequency circuit 202 includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any communications standard or protocol, including but not limited to global system for mobile communications, general packet radio service, code division multiple access, wideband code division multiple access, long term evolution, email, SMS message service, and the like.

The memory 203 is configured to store an application and data. The processor 201 runs the application and the data that are stored in the memory 203, to perform various functions of the mobile phone and process data. The memory 203 mainly includes a program storage area and a data storage area. The program storage area may store an operating system, and an application required by at least one function (for example, a sound playing function and an image playing function). The data storage area may store data (for example, audio data and a phone book) created based on use of the mobile phone. In addition, the memory 203 may include a high-speed random access memory, and may further include a nonvolatile memory such as a magnetic disk storage device and a flash memory, or another nonvolatile solid-state storage device. The memory 203 may store various operating systems such as an iOS® operating system developed by Apple and an Android® operating system developed by Google.

The touchscreen 204 may include a touch-sensitive surface 204-1 and a display 204-2. The touch-sensitive surface 204-1 (for example, a touch panel) may collect a touch event performed by a user on or near the mobile phone (for example, an operation performed by the user on the touch-sensitive surface 204-1 or near the touch-sensitive surface 204-1 by using any suitable object such as a finger or a stylus), and send collected touch information to another component, for example, the processor 201. The touch event performed by the user near the touch-sensitive surface 204-1 may be referred to as a floating touch. The floating touch may mean that the user does not need to directly touch the touchpad for selecting, moving, or dragging an object (for example, an icon), and the user only needs to be near the electronic device to perform a desired function. In an application scenario of the floating touch, terms such as "touch" and "contact" do not implicitly mean to directly touch the touchscreen, but to be near or close to the touchscreen. The touch-sensitive surface 204-1 on which the floating touch can be performed may be implemented in a capacitive type, an infrared photoreceptor type, an ultrasonic wave type, or the like. The touch-sensitive surface 204-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and sends the touch point coordinates to the processor 201. The touch controller may further receive an instruction sent by the processor 201, and execute the instruction. In addition, the touch-sensitive surface 204-1 may be implemented in a plurality of types such as a resistive type, a capacitive type, an infrared type, or a surface acoustic wave type. The display 204-2 (also referred to as a display screen) may be configured to display information entered by the user or information provided for the user, and menus of the mobile phone. The display 204-2 may be configured in a form such as a liquid crystal display or an organic light emitting diode. The touch-sensitive surface 204-1 may cover the display 204-2. After detecting the touch event on or near the touch-sensitive surface 204-1, the touch-sensitive surface 204-1 transmits the touch event to the processor 201 to determine a type of the touch event. Then, the processor 201 may provide corresponding visual output on the display 204-2 based on the type of the touch event. Although in FIG. 2, the touch-sensitive surface 204-1 and the display screen 204-2 are used as two independent components to implement input and output functions of the mobile phone, in some embodiments, the touch-sensitive surface 204-1 and the display screen 204-2 may be integrated to implement the input and output functions of the mobile phone. It may be understood that the touchscreen 204 is formed by stacking a plurality of layers of materials. Only the touch-sensitive surface (layer) and the display screen (layer) are presented in this embodiment of this application, and other layers are not recorded in this embodiment of this application. In addition, in some other embodiments of this application, the touch-sensitive surface 204-1 may cover the display 204-2, and a size of the touch-sensitive surface 204-1 is greater than a size of the display screen 204-2. Therefore, the display screen 204-2 is entirely covered by the touch-sensitive surface 204-1. Alternatively, the touch-sensitive surface 204-1 may be disposed on a front side of the mobile phone in a full panel form. In other words, any touch performed by the user on the front side of the mobile phone can be sensed by the mobile phone. In this way, full touch control experience on the front side of the mobile phone can be implemented. In some other embodiments, the touch-sensitive surface 204-1 is disposed on a front side of the mobile phone in a full panel form, and the display screen 204-2 may also be disposed on the front side of the mobile phone in a full panel form. In this way, a bezel-less structure can be implemented on the front side of the mobile phone.

The mobile phone may further include the Bluetooth apparatus 205, configured to exchange data between the mobile phone and another electronic device (for example, a mobile phone or a smartwatch) over a short distance. In this embodiment of this application, the Bluetooth apparatus may be an integrated circuit, a Bluetooth chip, or the like.

The mobile phone may further include at least one type of sensor 206, such as an optical sensor, a motion sensor, and another sensor. Specifically, the optical sensor may include an ambient light sensor and a proximity sensor. The ambient light sensor may adjust luminance of the display of the touchscreen 204 based on intensity of ambient light. The proximity sensor may power off the display when the mobile phone is moved to an ear. As one type of the motion sensor, an accelerometer sensor may detect acceleration values in all directions (usually on three axes). The accelerometer sensor may detect a value and a direction of gravity when the accelerometer sensor is stationary, and may be applied to an application for recognizing a posture of the mobile phone (such as switching between landscape mode and portrait mode, a related game, or magnetometer posture calibration), a function related to vibration recognition (such as a pedometer or a knock), and the like.

In some embodiments of this application, the sensor 106 may further include a fingerprint sensor. For example, the fingerprint sensor may be disposed on a back side of the mobile phone 100 (for example, below a rear-facing camera), or the fingerprint sensor is disposed on the front side of the mobile phone 100 (for example, below the touchscreen 104). In addition, the fingerprint sensor may be disposed on the touchscreen 104 to implement a fingerprint recognition function. In other words, the fingerprint sensor may be integrated with the touchscreen 104 to implement the fingerprint recognition function of the mobile phone 100. In this case, the fingerprint sensor may be disposed on the touchscreen 104 as a part of the touchscreen 104, or may be disposed on the touchscreen 104 in another manner. In addition, the fingerprint sensor may be further implemented as a full-panel fingerprint sensor. In this case, the touchscreen 104 may be considered as a panel on which a fingerprint may be collected in any position. The fingerprint sensor may send a collected fingerprint to the processor 101, so that the processor 101 processes the fingerprint (for example, verify the fingerprint). In this embodiment of this application, the fingerprint sensor may use any type of sensing technology, which includes but is not limited to an optical sensing technology, a capacitive sensing technology, a piezoelectric sensing technology, an ultrasonic sensing technology, and the like. In addition, for a specific technical solution of integrating the fingerprint sensor into the touchscreen in this embodiment of this application, refer to patent application No. US 2015/0036065 A1 announced by the United States Patent and Trademark Office and entitled "FINGERPRINT SENSOR IN AN ELECTRONIC DEVICE", whose controls are incorporated in this embodiment of this application by reference in its entirety.

Other sensors such as a gyroscope, a barometer, a hygrometer, a thermometer, and an infrared sensor may be further disposed on the mobile phone. Details are not described herein.

The Wi-Fi apparatus 207 is configured to provide the mobile phone with network access that complies with a Wi-Fi related standard or protocol. The mobile phone may access a Wi-Fi access point by using the Wi-Fi apparatus 207, to help the user send and receive an email, browse a web page, access streaming media, and the like. The Wi-Fi apparatus 207 provides wireless broadband internet access for the user. In some other embodiments, the Wi-Fi apparatus 207 may be used as a Wi-Fi wireless access point, and may provide Wi-Fi network access for another electronic device.

The positioning apparatus 208 is configured to provide a geographic location for the mobile phone. It may be understood that the positioning apparatus 208 may be specifically a receiver of a positioning system such as a global positioning system (GPS) or a BeiDou navigation satellite system. After receiving a geographic location sent by the positioning system, the positioning apparatus 208 sends the information to the processor 201 for processing, or sends the information to the memory 203 for storage. In some other embodiments, the positioning apparatus 208 may alternatively be a receiver of an assisted global positioning system (AGPS). The AGPS runs in a manner in which GPS positioning is performed with specific assistance. The AGPS can use a signal of a based station together with a GPS satellite signal, to speed up positioning performed by the mobile phone. In the AGPS system, the positioning apparatus 208 may obtain positioning assistance through communication with an assisted positioning server (for example, a positioning server of the mobile phone). The AGPS system assists the positioning apparatus 208 as an assisted server, to implement ranging and positioning services. In this case, the assisted positioning server communicates with the positioning apparatus 208 (namely, a GPS receiver) of the electronic device such as the mobile phone by using a wireless communications network, to provide positioning assistance.

The audio circuit 209, a speaker 212, and a microphone 213 may provide an audio interface between the user and the mobile phone. In one aspect, the audio circuit 209 may convert received audio data into an electrical signal and transmit the electrical signal to the speaker 212, and the speaker 212 converts the electrical signal into a sound signal for output. In another aspect, the microphone 213 converts a collected sound signal into an electrical signal, and the audio circuit 209 receives the electrical signal, converts the electrical signal into audio data, and then outputs the audio data to the RF circuit 202, to send the audio data to, for example, another mobile phone, or outputs the audio data to the memory 203 for further processing.

The peripheral interface 210 is configured to provide various interfaces for an external input/output device (for example, a keyboard, a mouse, a display externally connected to the mobile phone, an external memory, or a subscriber identity module card). For example, the mobile phone is connected to the mouse by using a universal serial bus interface, and the mobile phone is connected, by using a metal contact on a card slot of the subscriber identity module (SIM) card, to the subscriber identity module card provided by a telecommunications operator. The peripheral interface 210 may be configured to couple the external input/output peripheral device to the processor 201 and the memory 203.

The mobile phone may further include the power supply apparatus 211 (for example, a battery and a power supply management chip) that supplies power to the components. The battery may be logically connected to the processor 201 by using the power supply management chip, so that functions such as charging management, discharging management, and power consumption management are implemented by using the power supply apparatus 211.

Although not shown in FIG. 2, the mobile phone may further include a camera (a front-facing camera and/or a rear-facing camera), a flash, a micro projection apparatus, a near field communication (NFC) apparatus, and the like. Details are not described herein.

For example, the memory 203 on the mobile phone may store an Android® operating system. The operating system is a Linux-based mobile device operating system, and implements various functions by using the foregoing hardware on the mobile phone. The following describes a software architecture of the stored Android® operating system in detail. It should be noted that in this embodiment of this application, the Android® operating system is merely used as an example to describe a software environment required by a first electronic device to implement the technical solutions in the embodiments. A person skilled in the art may understand that this embodiment of this application can be implemented by using another operating system.

Figure 3:
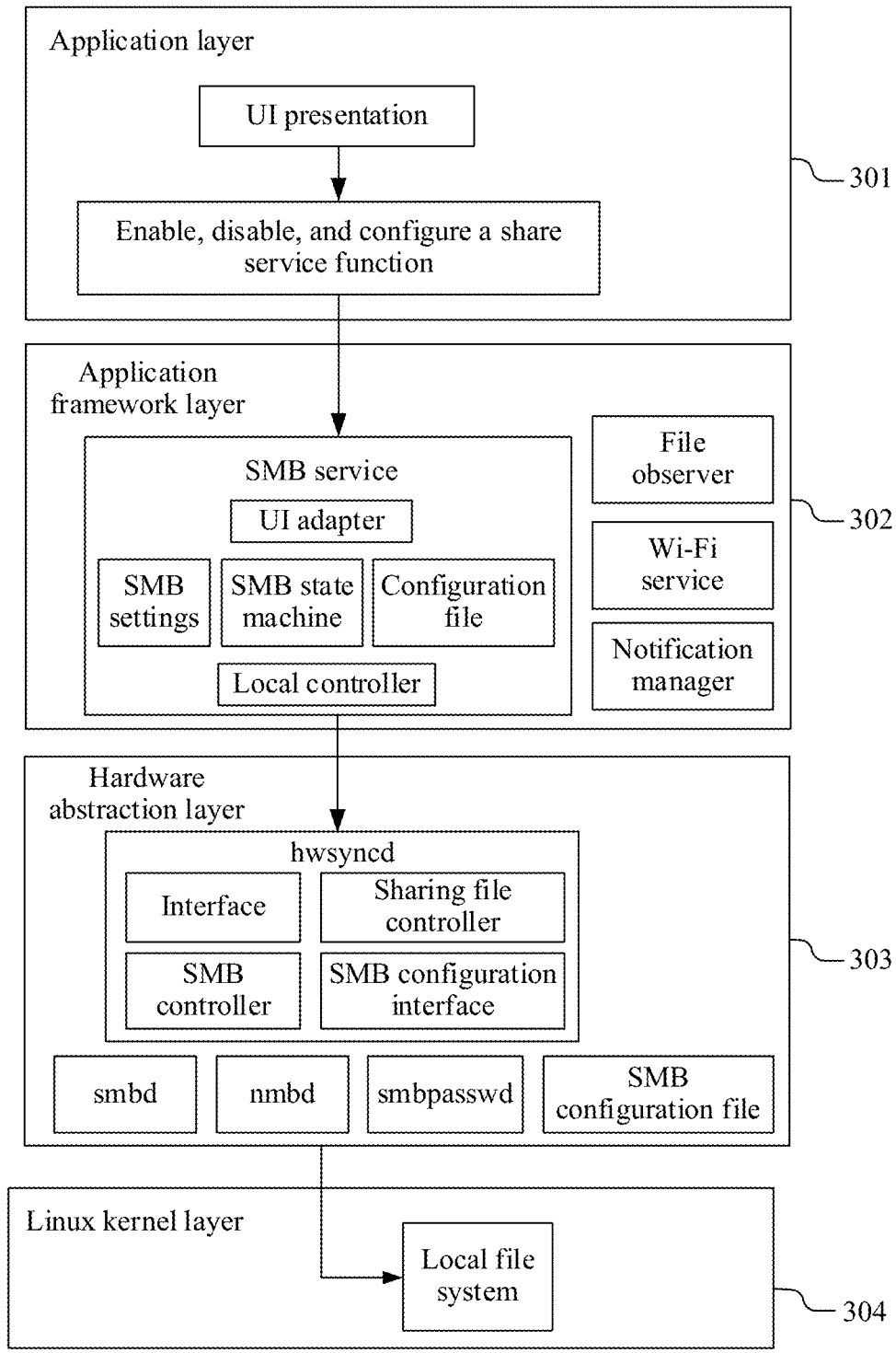
FIG. 3 is a schematic diagram of a software architecture that can be run on an electronic device according to an embodiment of this application.

For example, FIG. 3 is a schematic diagram of a software architecture that can be run on the first electronic device. As shown in FIG. 3, the software architecture may be divided into four layers: an application layer 301, an application framework layer 302, a hardware abstraction layer 303, and a Linux kernel layer 304.

The application layer 301 is the uppermost layer of the operating system, and includes native applications in the operating system, such as an email client, messages, phone, calendar, browser, and contacts. Certainly, a developer may compile an application and install the application at the layer. The application is usually developed by using a Java language. This is implemented by invoking an application programming interface (API) provided at the application framework layer 302. In some embodiments of this application, the application layer 301 is mainly responsible for presenting a settings UI. The settings UI may be used for the user to set a data sharing function of the first electronic device. For example, the user may enable or disable the data sharing function on the settings UI, and may further configure the data sharing function on the settings UI, for example, set a to-be-discovered share name and set a user name and a password for login authentication. For example, the settings UI may be a status bar or a notification bar displayed on the touchscreen of the first electronic device, or may be a share control screen displayed on the touchscreen of the first electronic device.

The application framework layer 302 mainly provides a developer with various APIs that can be used to access applications. The developer may interact with a bottom layer (for example, the hardware abstraction layer or the Linux kernel layer) of the operating system by using an application framework, to develop an application of the developer. The application framework mainly includes a series of services and management systems of the Android® operating system. In some embodiments of this application, the application framework layer 302 includes an SMB service, and is mainly responsible for invoking a service interface used for communication with the hardware abstraction layer 303, to transfer a request for enabling or disabling the data sharing function to the hardware abstraction layer 303. The application framework layer 302 is further responsible for managing device information, for example, managing the to-be-discovered share name and managing the user name and the password for login authentication. For example, the SMB service may include various modules configured to manage the data sharing function. For example, the SMB service includes a UI adapter, SMB settings, an SMB state machine, a native controller, and the like. The SMB service may further include a configuration file. In some other embodiments, the data sharing function is implemented as a subfunction of an original sharing function of the first electronic device. For example, a data sharing function is implemented as a subfunction of a Huawei Share function of a Huawei mobile phone. In this case, the SMB service may exist in the Huawei Share application in a form of a submodule, and a target file path of the SMB service may be src/main/java/com/huawei/android/hwshare/hwsync/. The UI adapter is configured to provide a service for the settings UI at the upper layer. For example, when the user performs an operation on a share on/off button for the data sharing function, the UI adapter may provide a corresponding service for the settings UI, to change a status (for example, switching from an off state to an on state) of the share on/off button for the data sharing function on the settings UI. The SMB settings service is mainly responsible for storing the to-be-discovered share name and/or the user name and the password for login authentication. The SMB state machine is mainly responsible for monitoring a running status of a share service at the bottom layer. The native controller is mainly responsible for controlling a signal at the bottom layer. The configuration file is used to store a shared directory, a file directory, a share scope setting for a user, and the like.

The application framework layer 302 may further include a file observer (File Observer), a Wi-Fi service, and a notification manager. The three modules are mainly responsible for cooperating with the SMB service to provide the data sharing function. For example, the Wi-Fi service is used to monitor whether the first electronic device is connected to a wireless access point. For another example, the notification manager is configured to transmit a notification message to the upper layer, so that the notification message is presented on the touchscreen of the first electronic device.

The hardware abstraction layer (HAL) 303 is a support of the application framework, and an important link for connecting the application framework layer 302 and the Linux kernel layer 304. The hardware abstraction layer 303 may provide a service for a developer by using the application framework layer 302. In some embodiments of this application, the hardware abstraction layer 303 is mainly responsible for providing a service interface used for communication with the application framework layer 302, and further managing a share service, an SMB configuration file, smbpasswd, and the like. The SMB configuration file may be used to store the to-be-discovered share name. The smbpasswd may be used to store information such as the user name and the password for login authentication. For example, a function of the hardware abstraction layer 303 in this embodiment of this application may be implemented by configuring hwsyncd at the hardware abstraction layer 303. The hwsyncd may be a subprocess individually constructed at the hardware abstraction layer 303, and a target file path of the hwsyncd may be vendor/huawei/chipset_common/modules/fs/hwsyncd. The hardware abstraction layer 303 may further include a daemon process smbd/nmbd. The daemon process may be a subprocess individually constructed at the hardware abstraction layer 303, and a target file path of the daemon process may be vendor/huawei/chipset_common/modules/fs/samba server. The hwsyncd may include modules such as an interface, an SMB controller, a sharing file controller, and an SMB configuration interface. The interface is the service interface used for communication with the application framework layer 302. The SMB controller is configured to monitor an SMB service configuration at an upper layer, for example, control whether authentication needs to be performed. The sharing file controller is mainly responsible for monitoring whether a file in the first electronic device is updated. When an update occurs, the sharing file controller may instruct the upper layer to update a shared directory and the like.

The Linux kernel layer 304 provides a core system service of the operating system. For example, security, memory management, process management, a network protocol stack, and a driver model are all based on a Linux kernel. The Linux kernel is also used as an abstraction layer between hardware and a software stack. The layer has many drivers related to the electronic device, mainly including a display driver, a Linux-based frame buffer driver, a driver of a keyboard used as an input device, a flash driver that is based on a memory technology device, a camera driver, an audio driver, a Bluetooth driver, a Wi-Fi driver, and the like. In some embodiments of this application, the Linux kernel layer 304 depends on a local file system. The local file system may be accessed by using the share service, and shared data in the local file system may be configured by using the service interface at the hardware abstraction layer 303.

All technical solutions in the following embodiments may be implemented on an electronic device that has the foregoing hardware architecture and software architecture.

Figure 4:
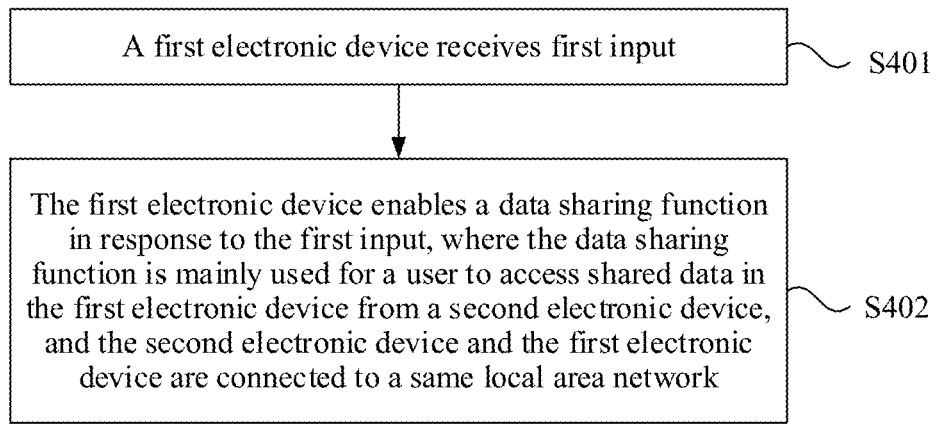
FIG. 4 is a schematic flowchart of a method for sharing data in a local area network according to an embodiment of this application.

For example, FIG. 4 is a schematic flowchart of a method for sharing data in a local area network according to an embodiment of this application. As shown in FIG. 4, the method may include S401 and S402.

For ease of understanding, in this embodiment of this application, that a first electronic device is a mobile phone, a second electronic device is a notebook computer, and shared data in the mobile phone is accessed by using the notebook computer is used as an example to specifically describe the method for sharing data in a local area network provided in this embodiment of this application.

S401: The first electronic device receives first input.

For example, the first input may be specifically an operation performed by a user on a share on/off button for a data sharing function of the first electronic device, and the on/off button is used to enable or disable the data sharing function. The data sharing function may be a function of providing a data sharing service between different electronic devices by using a local area network shared access protocol, for example, the SMB protocol. For example, Samba software may be installed on the mobile phone and two daemon processes smbd/nmbd included in the Samba software and another configuration may be adaptively modified, to implement the data sharing function of the first electronic device. The Samba software is software for implementing the SMB protocol.

Figure 5A:
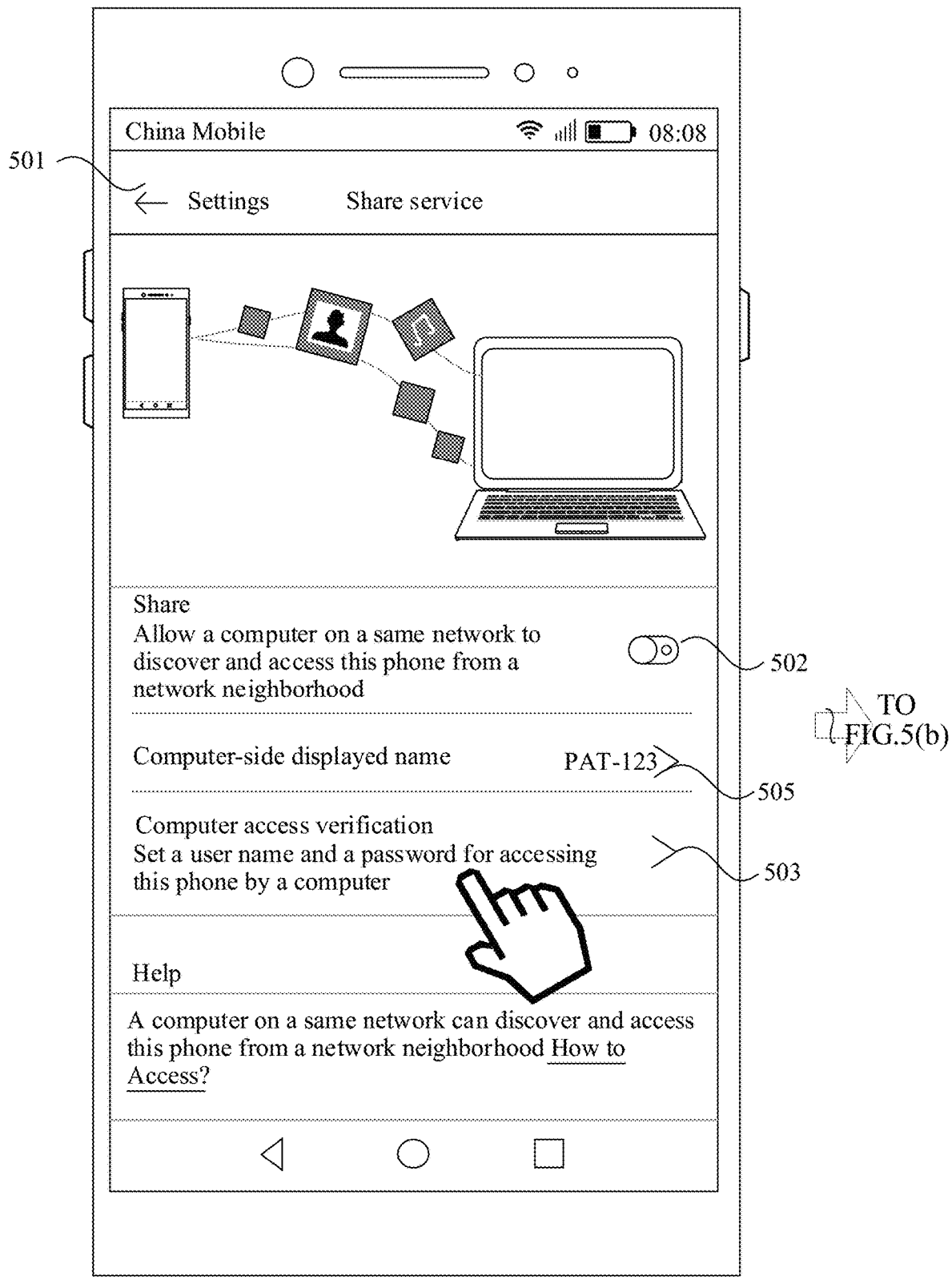
FIG. 5($a$) and FIG. 5($b$) are schematic diagrams of some graphical user interfaces displayed on an electronic device according to some embodiments of this application.
Figure 5B:
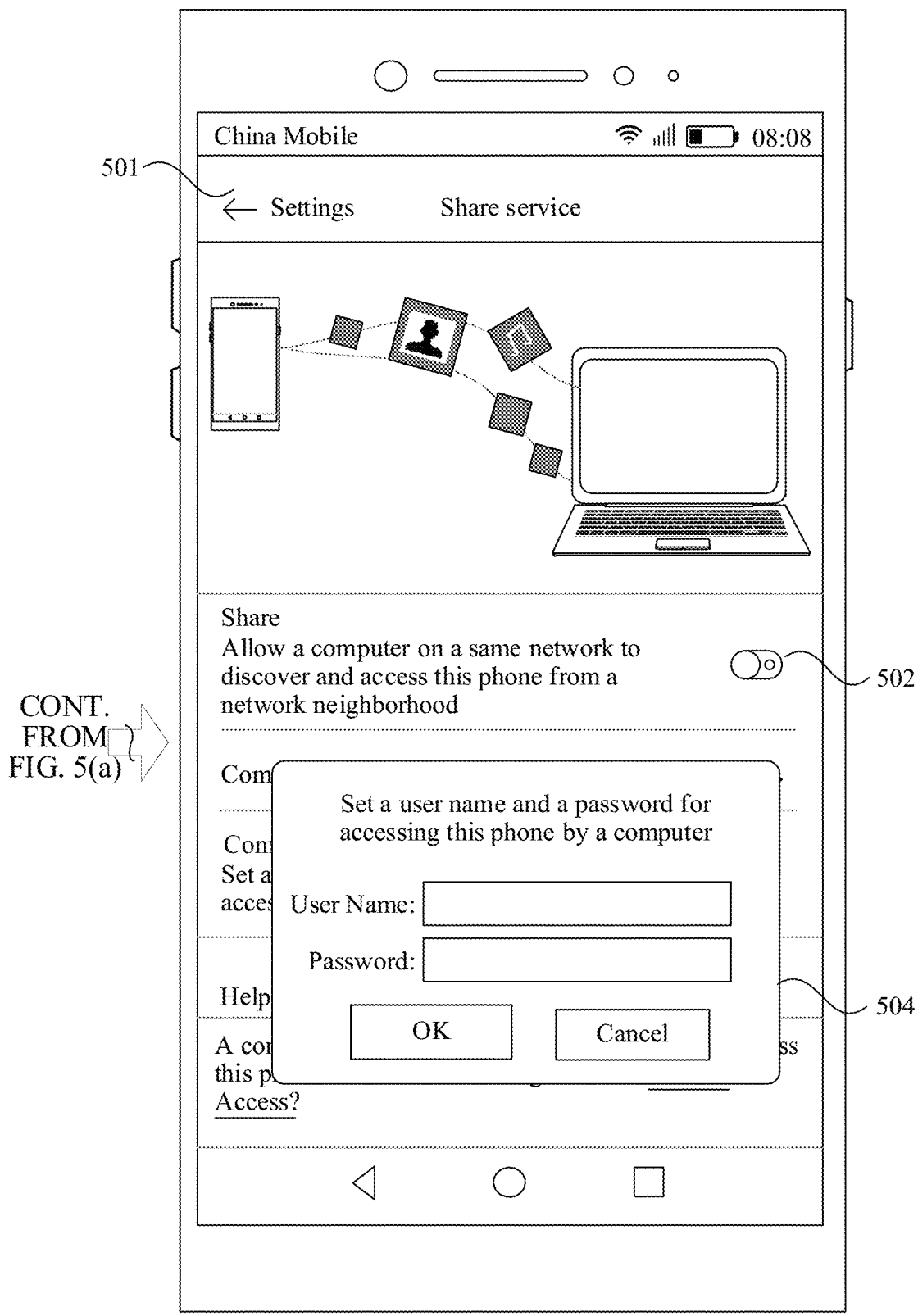

In some embodiments of this application, the share on/off button for the data sharing function may be included on a share control screen, or may be included on a notification bar of the first electronic device. For example, in some embodiments, as shown in FIG. 5(a), the first input may be an operation performed by the user on a share on/off button 502 for the data sharing function on a share control screen 501 displayed on a touchscreen of the mobile phone. In response to the user's operation on the share on/off button 502 for the data sharing function, a status of the share on/off button 502 for the data sharing function changes, for example, switches from an off state (as shown in FIG. 5(a) and FIG. 5(b)) to an on state (not shown in the figures).

Figure 6:
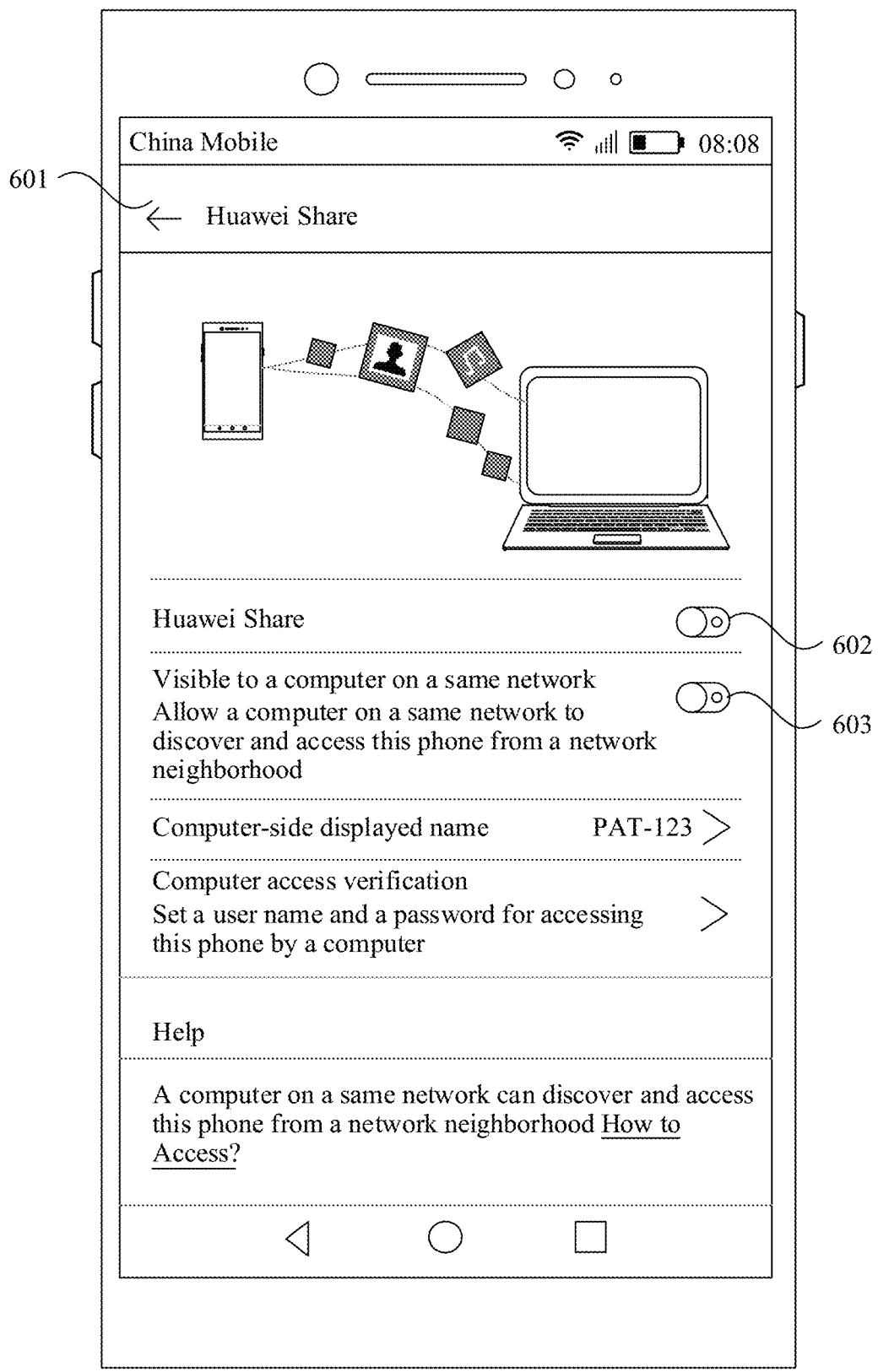
FIG. 6 is a schematic diagram of some graphical user interfaces displayed on an electronic device according to some other embodiments of this application.

In some other embodiments of this application, the data sharing function may be implemented as a subfunction of an original sharing function of the first electronic device. For example, a data sharing function of a Huawei mobile phone is implemented as a subfunction of a Huawei Share function of the mobile phone. In this case, as shown in FIG. 6, the first input may be an operation performed by the user on an on/off button 602 for the Huawei Share function and on an on/off button 603 for "visible to a computer on a same network", where the on/off button 602 and the on/off button 603 are located on the share control screen, for example, a control screen 601 for the Huawei Share function, displayed on the touchscreen of the mobile phone. The data sharing function of the mobile phone is enabled only when both the on/off button 602 for the Huawei Share function and the on/off button 603 for "visible to a computer on a same network" are enabled. A main function of the on/off button 602 for the Huawei Share function is to enable/disable the Huawei Share function. The user may perform an operation on the on/off button 602 for the Huawei Share function. After receiving the user's operation on the on/off button 602 for the Huawei Share function, the mobile phone may invoke a related system service interface to enable/disable the Huawei Share function, and may switch a status (for example, switching from an off state to an on state) of the on/off button 602 for the Huawei Share function in response to the user's operation. The control screen 601 for the Huawei Share function may further include a real-time status identifier (not shown in FIG. 6) for the Huawei Share function. The mobile phone may monitor a real-time status for the Huawei Share function in a settings database in a manner of registration as an observer. The real-time status identifier for the Huawei Share function on the control screen 601 may be correspondingly updated depending on a change of the status for the Huawei Share function. The control screen 601 for the Huawei Share function may further include a pop-up dialog box (not shown in FIG. 6) for switching a visible range. The pop-up dialog box is used for the user to switch the visible range for the Huawei Share function. The user may perform an operation on a settings screen or a notification option on a notification bar, to trigger the mobile phone to display the pop-up dialog box on the touchscreen. After the pop-up dialog box is displayed, the pop-up dialog box disappears when the status for the Huawei Share function changes. In some embodiments, when the user selects the visible range to be visible to "all devices", when the mobile phone is connected to an open wireless access point or allows password-free access from another electronic device, the mobile phone may display a pop-up window, to remind the user that there is a risk of enabling the Huawei Share function. In addition, when the user enables the Huawei Share function, the mobile phone may further verify a right of the user, for example, whether the user is allowed to enable the Huawei Share function and/or whether the user is allowed to obtain a Huawei account.

In some other embodiments of this application, when the user sets the data sharing function for the first time, the first electronic device may display a series of guide screens, to guide the user to set the data sharing function. The first electronic device may further store a setting preference of the user, so that a sharing function can be set based on the setting preference of the user next time.

Figure 7A:
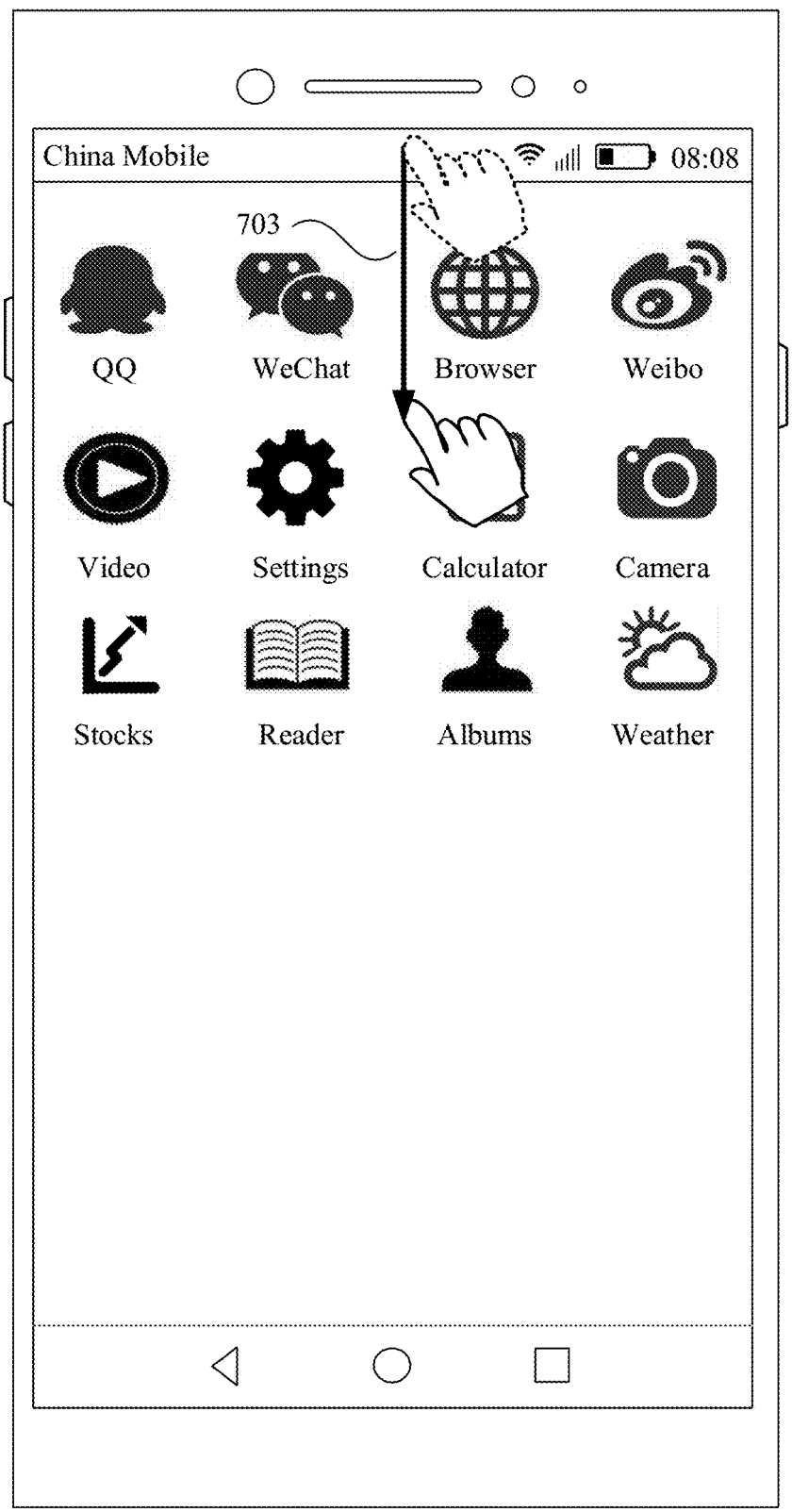
FIG. 7($a$) and FIG. 7($b$) are schematic diagrams of some other graphical user interfaces displayed on an electronic device according to some other embodiments of this application.
Figure 7B:
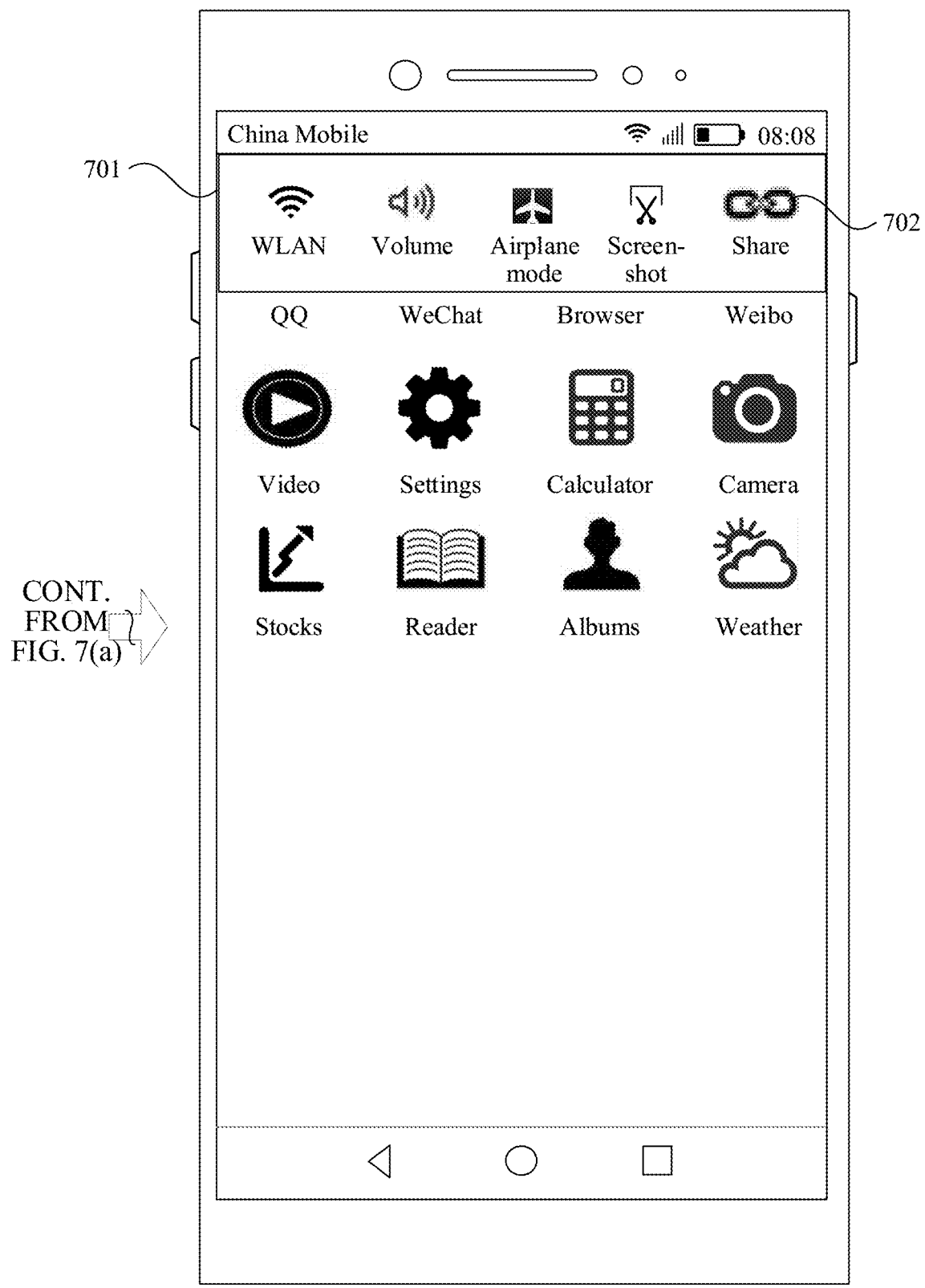

In some other embodiments, as shown in FIG. 7(b), the first input may alternatively be an operation performed by the user on a share on/off button 702 for the data sharing function on a notification bar 701 displayed on the touchscreen of the mobile phone. The notification bar 701 may be a screen displayed for the user on the touchscreen of the mobile phone, for example, displayed after the user performs a swiping operation on a home screen of the mobile phone according to a swiping track 703 shown in FIG. 7(a).

In some other embodiments of this application, the share on/off button for the data sharing function may be a physical button. The button may be disposed on a surface of the first electronic device. After a finger of the user presses or switches the physical button (namely, the first input), the first electronic device enables the data sharing function. After a finger of the user presses or switches the physical button again, the first electronic device may disable the data sharing function.

In some other embodiments of this application, the first input may alternatively be an operation of automatically enabling, by the first electronic device, the data sharing function of the first electronic device when a specific condition is met.

For example, when the first electronic device and the second electronic device establish wireless connections to a same Wi-Fi hotspot, the first electronic device may automatically enable the data sharing function. After establishing the wireless connection to the Wi-Fi hotspot, the second electronic device may broadcast a Wi-Fi frame, where the Wi-Fi frame may carry an identifier of the Wi-Fi hotspot to which the second electronic device establishes the wireless connection, so that the first electronic device learns, based on the received Wi-Fi frame, whether the second electronic device and the first electronic device establish the wireless connections to the same Wi-Fi hotspot.

For another example, when the first electronic device and the second electronic device establish connections to a same Wi-Fi hotspot, and the first electronic device and the second electronic device trust each other, the first electronic device automatically enables the data sharing function. That the first electronic device and the second electronic device trust each other may be that the first electronic device and the second electronic device are logged in by using a same account. The account may be an account provided by an operator for the user, such as a Xiaomi account or a Huawei account, or may be an application account, such as a WeChat account or a Youku account. The Wi-Fi frame may further carry the account, so that the first electronic device learns, based on the Wi-Fi frame, whether the second electronic device and the first electronic device are logged in by using the same account. For example, when the first electronic device and the second electronic device establish the connections to the same Wi-Fi hotspot, the first electronic device obtains a second user identifier of the second electronic device, for example, a Huawei account used to log in to the second electronic device, and determines whether the second user identifier of the second electronic device is the same as a first user identifier stored in the first electronic device, for example, a Huawei account used to log in to the first electronic device. If the first electronic device determines that the second user identifier is the same as the first user identifier, it indicates that the first electronic device and the second electronic device trust each other. In this case, the first electronic device may automatically enable the data sharing function. In addition, a notification message may be displayed on a touchscreen of the second electronic device, to notify the user that the first electronic device has enabled the data sharing function.

S402: The first electronic device enables the data sharing function in response to the first input, where the data sharing function is mainly used for the user to access the shared data in the first electronic device from the second electronic device, and the second electronic device and the first electronic device are connected to a same local area network.

When the user wants to access the shared data in the first electronic device from the second electronic device, the user may perform the first input, to enable the data sharing function of the first electronic device. In this way, when the first electronic device and the second electronic device are connected to the same local area network, the user can access the shared data in the first electronic device from the second electronic device. To be specific, in some other embodiments of this application, the method may further include: establishing, by the first electronic device, a wireless connection to a wireless access point, and establishing, by the second electronic device, a wireless connection to the wireless access point, so that the user can access the shared data in the first electronic device from the second electronic device subsequently. For example, the wireless access point may be a Wi-Fi hotspot, or may be a Bluetooth beacon.

For example, with reference to FIG. 3, FIG. 5(a), and FIG. 5(b), when the user wants to access the shared data in the mobile phone from the notebook computer, the user may perform, by using a finger, a touch operation on the share on/off button 502 for the data sharing function on the share control screen 501 displayed on the touchscreen of the mobile phone. In this case, an application layer of an Android® operating system running on the mobile phone may detect the operation. After converting the detected operation into a request for enabling the data sharing function, the application layer transfers the request to an application framework layer of the Android® operating system running on the mobile phone. After receiving the request, the application framework layer invokes a service interface used for communication with a hardware abstraction layer of the Android® operating system running on the mobile phone, to transfer the request for enabling the data sharing function to the hardware abstraction layer. After receiving the request for enabling the data sharing function, the hardware abstraction layer enables the data sharing function of the mobile phone. For example, the hardware abstraction layer may start the two daemon processes smbd/nmbd, to enable the data sharing function of the mobile phone. The daemon process smbd can provide functions such as a data sharing service and user right verification, and can enable an SMB service. The daemon process nmbd can enable the notebook computer to access a local file system at a Linux kernel layer of the Android® operating system running on the mobile phone. A main function of the daemon process nmbd is to provide a network basic input/output system (NetBIOS) name service and enable an nmb service, and a port 137 for the UDP protocol is used for the daemon process nmbd.

Figure 8:
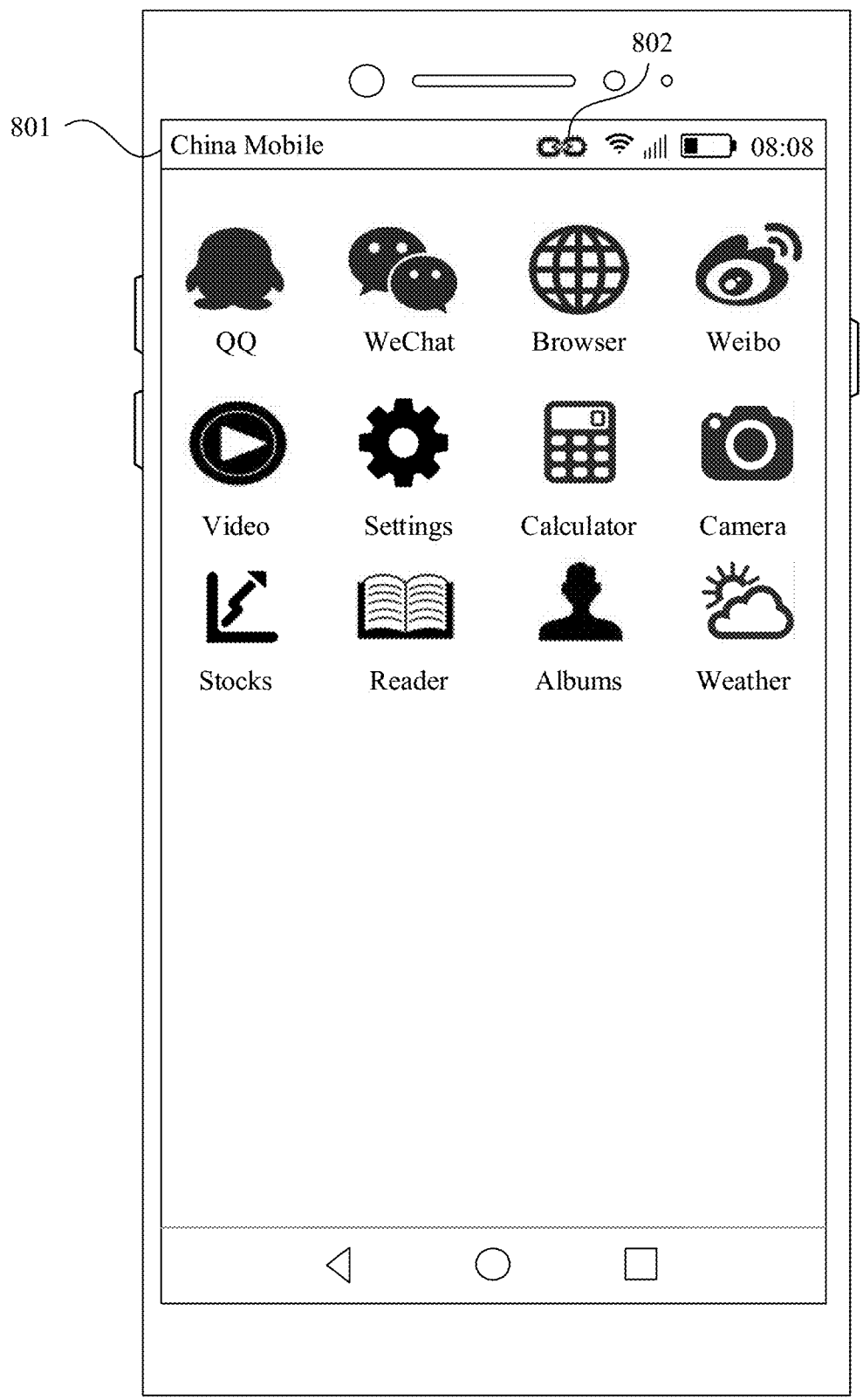
FIG. 8 is a schematic diagram of some other graphical user interfaces displayed on an electronic device according to some other embodiments of this application.

In some other embodiments of this application, after the data sharing function is enabled, a share status identifier may be further displayed on the touchscreen of the first electronic device, where the share status identifier is used to indicate that the data sharing function has been enabled. For example, after enabling the data sharing function, the hardware abstraction layer may send, to the application framework layer, a notification message indicating that the data sharing function has been enabled. After receiving the notification message, the application framework layer forwards the notification message to the application layer. After receiving the notification message, the application layer may display, on the touchscreen of the mobile phone, the share status identifier used to indicate that the data sharing function has been enabled. For example, as shown in FIG. 8, the mobile phone may display a share icon 802 on a status bar 801 displayed on the touchscreen of the mobile phone, to indicate, to the user, that the data sharing function of the mobile phone has been enabled.

In some other embodiments of this application, the user may further set, on the share control screen, a to-be-discovered share name of the first electronic device serving as a share server, a range of the shared data that can be accessed by a share client, a user name and a password for login authentication, and the like.

For example, with reference to FIG. 3, FIG. 5(a), and FIG. 5(b), the user wants to set a user name and a password for login authentication. As shown in FIG. 5(a), the user may perform an operation on a computer access verification option 503 on the share control screen 501. In this case, the application layer may detect the operation. The application layer converts the operation into a request for setting a user name and a password for login authentication, and transfers the request to the application framework layer. After receiving the request, the application framework layer provides the application layer with a function of setting a user name and a password for login authentication. In this case, as shown in FIG. 5(b), in response to the operation, the application layer may display, on the touchscreen of the mobile phone based on the function provided by the application framework layer, a dialog box 504 for setting a user name and a password. The user may enter a corresponding user name and password in the dialog box 504 for setting a user name and a password, and tap an OK button after completing entering the user name and the password. The application layer transmits the user name and the password that are entered by the user to the application framework layer based on the user's tap operation on the OK button. After receiving the user name and the password, the application framework layer invokes the service interface used for communication with the hardware abstraction layer, to transfer the received user name and password to the hardware abstraction layer. After receiving the user name and password, the hardware abstraction layer stores the received user name and password in smbpasswd. In this case, setting a user name and a password for login authentication is implemented. In some other embodiments of this application, the user name and the password for login authentication may not only be stored in smbpasswd at the hardware abstraction layer, but also stored at the application framework layer in one copy. In this way, when validity of the user name and the password that are entered by the user on the computer side is verified, the valid user name and password can be queried from the copy stored at the application layer. This reduces interaction between the layers. In some other embodiments of this application, the user may alternatively not set a user name and a password for login authentication. In this case, default configurations are used for a user name and a password for login authentication. In some other embodiments of this application, during setting a user name and a password for login authentication, if the user deletes a default user name and password for login authentication, and does not set a new user name and password for login authentication, the second electronic device does not need to enter a user name and a password and can automatically access the first electronic device when accessing the first electronic device. In addition, in some embodiments of this application, the first electronic device may further provide the user with a screen for selecting whether access from the second electronic device needs to be verified, to determine whether to enable a password-free access function.

For example, the user wants to set a to-be-discovered share name of the mobile phone serving as the share server. As shown in FIG. 5(a), the user may perform an operation on a computer-side displayed name option 505 on the share control screen 501. In this case, the application layer may detect the operation. The application layer converts the operation into a request for setting a to-be-discovered share name, and transfers the request to the application framework layer. After receiving the request, the application framework layer provides the application layer with a function of setting a to-be-discovered share name. In this case, in response to the operation, the application layer may display, on the touchscreen of the mobile phone based on the function provided by the application framework layer, a dialog box for setting a to-be-discovered share name. The user may enter a corresponding name in the dialog box for setting a to-be-discovered share name, and tap an OK button after completing entering the name. The application layer transmits the name entered by the user to the application framework layer based on the user's tap operation on the OK button. The application framework layer receives the name, and invokes the service interface used for communication with the hardware abstraction layer, to transfer the received name to the hardware abstraction layer. After receiving the name, the hardware abstraction layer stores the received name in an SMB configuration file. In this case, setting a to-be-discovered share name is implemented. In some embodiments, before the user taps the OK button, the mobile phone may further verify validity of the to-be-discovered share name entered by the user, and the user can perform an operation on the OK button only when the mobile phone detects that the to-be-discovered share name entered by the user is valid. If the mobile phone detects that the to-be-discovered share name entered by the user is invalid, the mobile phone may display a prompt dialog box indicating, to the user, that the to-be-discovered share name is invalid. In some other embodiments of this application, the to-be-discovered share name may not only be stored in the SMB configuration file at the hardware abstraction layer, but also stored at the application framework layer in one copy. In this way, when the to-be-discovered share name needs to be queried subsequently, the to-be-discovered share name can be found from the copy stored at the application layer. This reduces interaction between the layers. In some other embodiments of this application, the user may not set a to-be-discovered share name. In this case, a default configuration is used for the to-be-discovered share name. For example, as shown in FIG. 5, a default to-be-discovered share name of the mobile phone serving as the share server is PAT-123. If the user does not change the to-be-discovered share name, a share server name found by the notebook computer side is PAT-123.

Figure 9A:
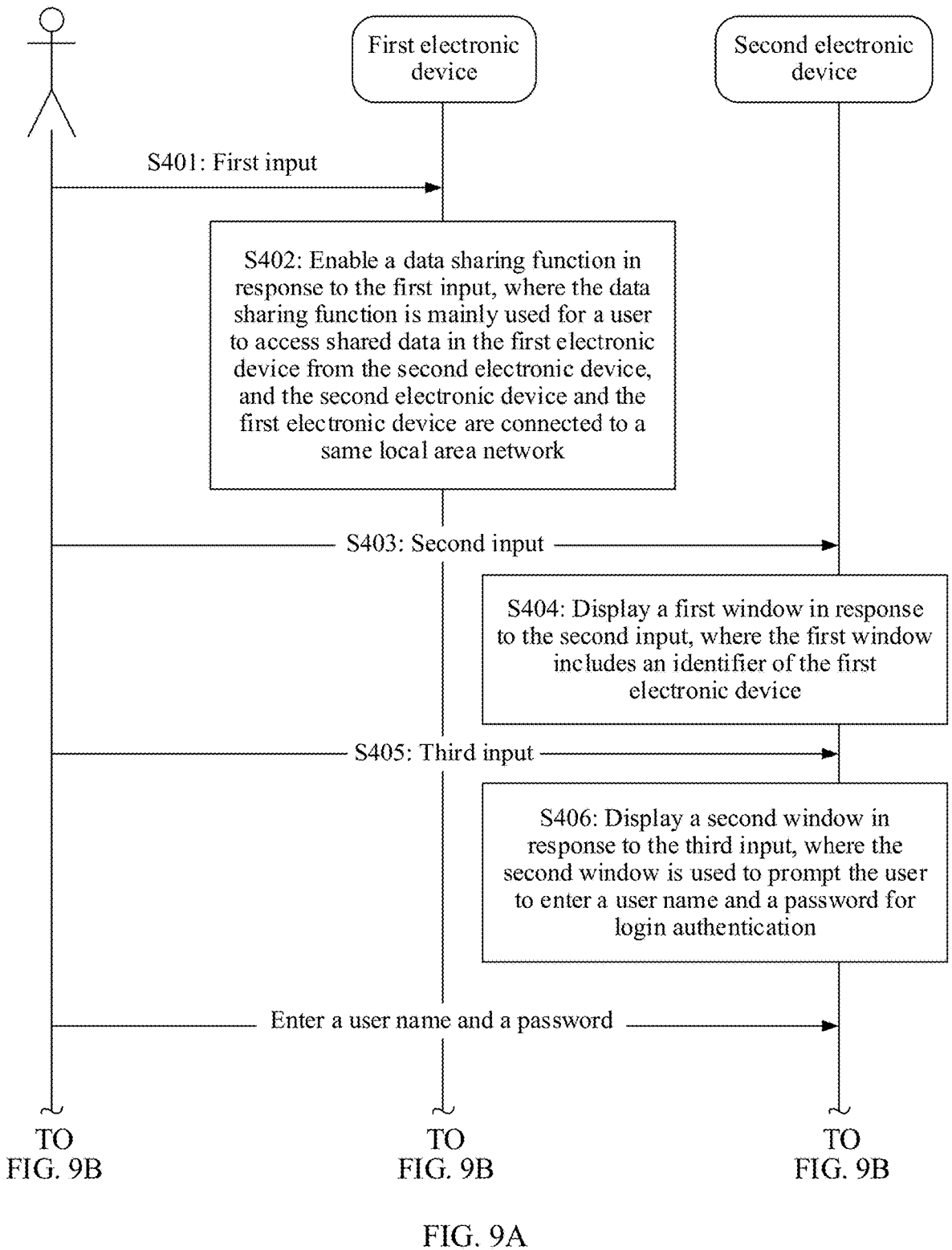
FIG. 9A and FIG. 9B are a schematic flowchart of a method for sharing data in a local area network according to another embodiment of this application.
Figure 9B:
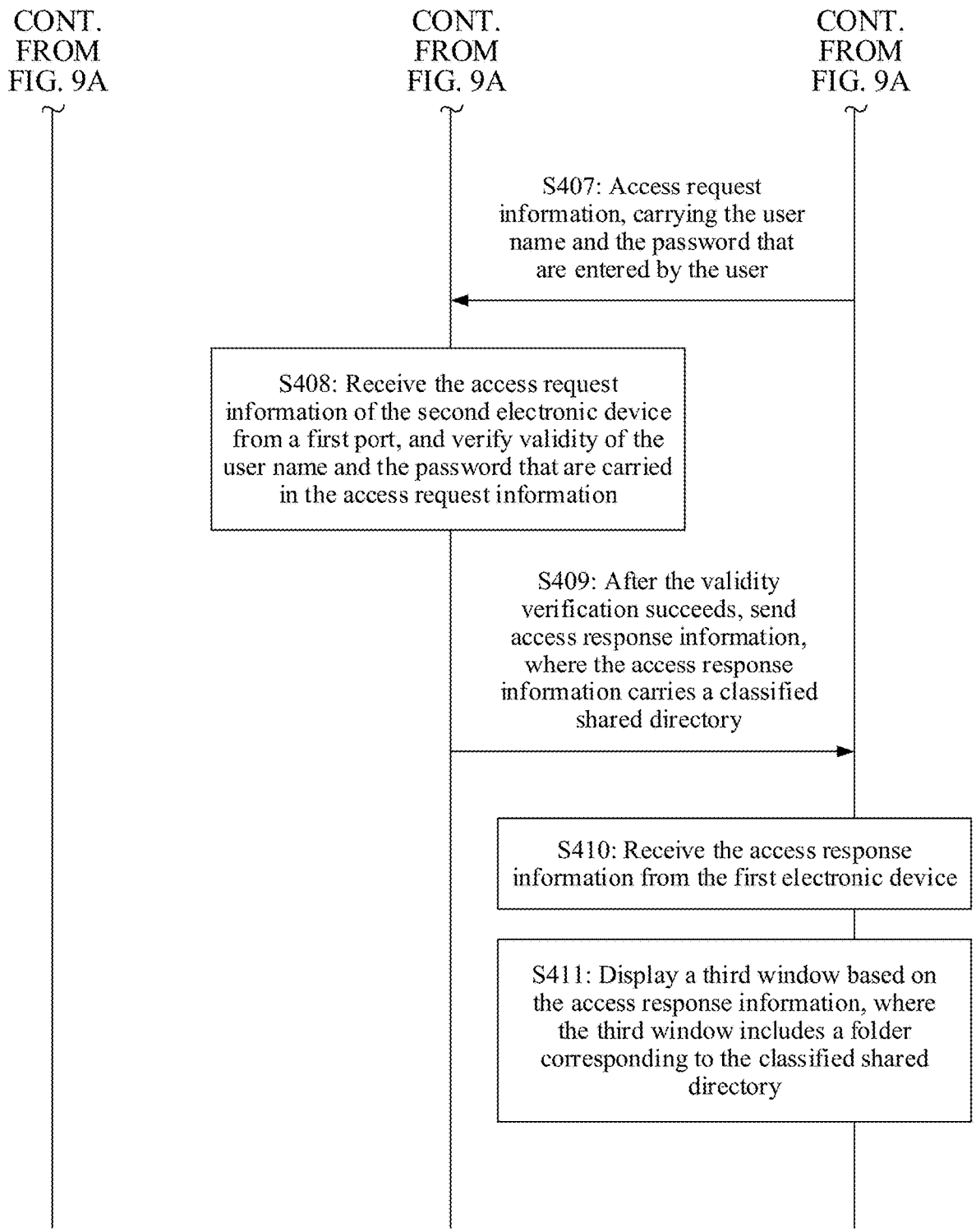

After the data sharing function is enabled, when the first electronic device and the second electronic device are connected to the same local area network, the user can find the first electronic device by using the second electronic device. Specifically, in some other embodiments of this application, as shown in FIG. 9A and FIG. 9B, the method for sharing data in a local area network may further include the following operations S403 to S411.

S403: The second electronic device receives second input.

For example, when the second electronic device is a Mac computer of Apple, the second input may be an operation on a network function of the Mac computer. When the second electronic device is a Windows computer, the second input may be an operation on a network neighborhood icon on the Windows computer. Alternatively, the second input may be an operation on a prompt dialog box on a notification bar or a taskbar of the second electronic device. The prompt dialog box is used to indicate that the first electronic device has enabled the data sharing function. Alternatively, the second input may be an operation on a related icon on a notification bar or a taskbar of the second electronic device. The icon is used to enable a network-related function of the second electronic device.

S404: The second electronic device displays a first window in response to the second input, where the first window includes an identifier of the first electronic device.

The identifier of the first electronic device may include a device icon of the first electronic device and/or a to-be-discovered share name of the first electronic device serving as a share server.

Figure 10:
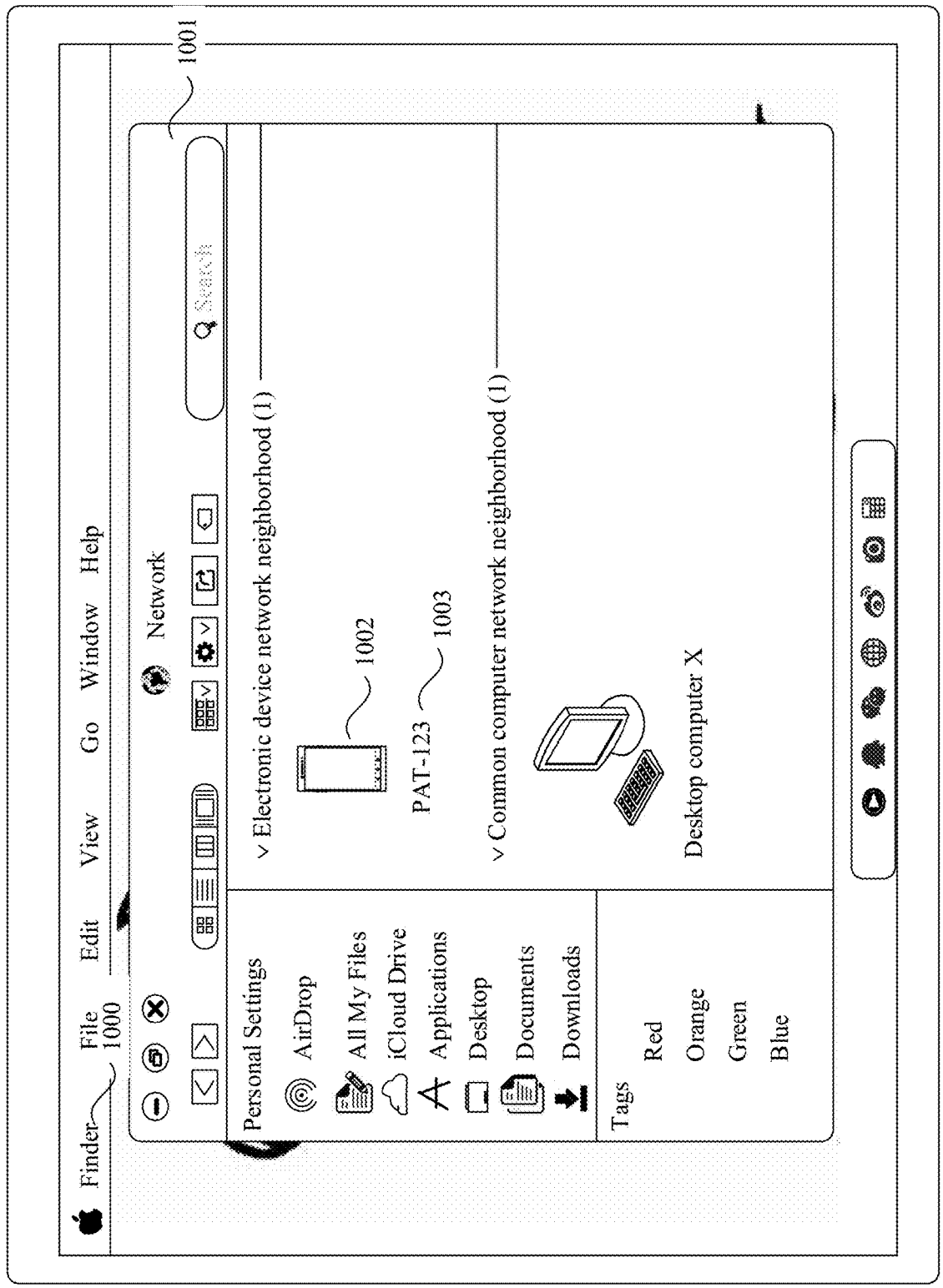
FIG. 10 is a schematic diagram of some other graphical user interfaces displayed on an electronic device according to some other embodiments of this application.
Figure 11:
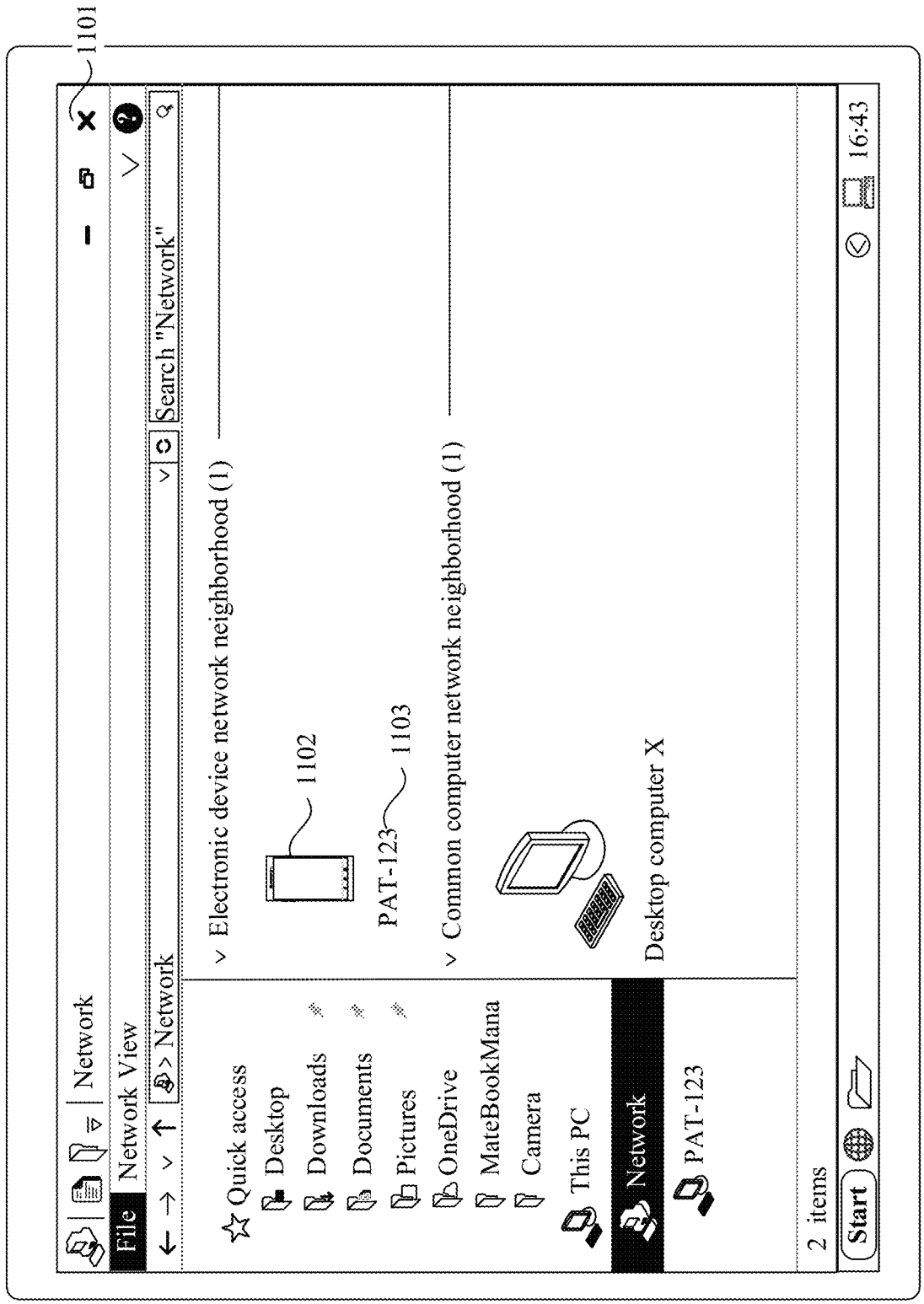
FIG. 11 is a schematic diagram of some other graphical user interfaces displayed on an electronic device according to some other embodiments of this application.

For example, as shown in FIG. 10, the first electronic device is a mobile phone, and the second electronic device is a Mac notebook computer of Apple. The user enables a network function of the Mac notebook computer by using a Finder icon 1000 of the Mac notebook computer. In response to a user's click operation, the Mac notebook computer displays a first window 1001. The first window 1001 may be a network function details window on the Mac notebook computer, and the details window includes an identifier of the mobile phone. Specifically, as shown in FIG. 10, the details window includes an icon 1002 of the mobile phone and a to-be-discovered share name 1003 of the mobile phone serving as the share server, for example, PAT-123. For example, as shown in FIG. 11, the first electronic device is a mobile phone, and the second electronic device is a Windows notebook computer of Huawei. The user opens a network neighborhood of the Windows notebook computer. In response to a user's click operation, the Windows notebook computer displays a first window 1101. The first window 1101 may be a network neighborhood details window, and the details window includes an identifier of the mobile phone. Specifically, as shown in FIG. 11, the details window includes an icon 1102 of the mobile phone and a to-be-discovered share name 1103 of the mobile phone serving as the share server, for example, PAT-123.

In some embodiments of this application, as shown in FIG. 10 and FIG. 11, the first window may include two parts of content: a common computer network neighborhood and an electronic device network neighborhood. The common computer network neighborhood includes an identifier of a common computer discovered by the second electronic device, and the electronic device network neighborhood includes the identifier of the first electronic device, for example, the mobile phone, discovered by the second electronic device. This helps the user differentiate a device type of the share server discovered by the second electronic device, for example, determine whether the device type of the share server is a common computer or a mobile phone. In some other embodiments of this application, discovered devices on the first window may not be differentiated based on a device type of a share server.

For example, in some other embodiments, the user may perform an operation on the prompt dialog box on the notification bar or the taskbar of the second electronic device. Corresponding to the operation, the second electronic device opens the first window. In some other embodiments, the user may perform an operation on the related icon on the notification bar or the taskbar of the second electronic device. Corresponding to the operation, the second electronic device opens the first window.

S405: The second electronic device receives third input, where the third input may be specifically an operation on the identifier of the first electronic device.

In some embodiments of this application, the operation on the identifier of the first electronic device may be specifically an operation on an icon of the first electronic device, or may be an operation on the to-be-discovered share name of the first electronic device.

S406: The second electronic device displays a second window in response to the third input, where the second window is used to prompt the user to enter a user name and a password for login authentication.

The second window may also be referred to as a verification window, and is used to prompt the user to enter the user name and the password for login authentication.

When the first electronic device side does not allow password-free access, after the user performs the operation on the identifier of the first electronic device on the first window shown in FIG. 10 or FIG. 11, in response to the operation, the second electronic device displays the second window for the user to enter the user name and the password for login authentication.

S407: The second electronic device adds, to access request information, the user name and the password that are entered by the user, and sends the access request information to the first electronic device.

After the second electronic device receives input confirmation of the user, the second electronic device may add, to the access request information, the user name and the password that are entered by the user, and send the access request information to the first electronic device by using the foregoing wireless access point.

Figure 12:
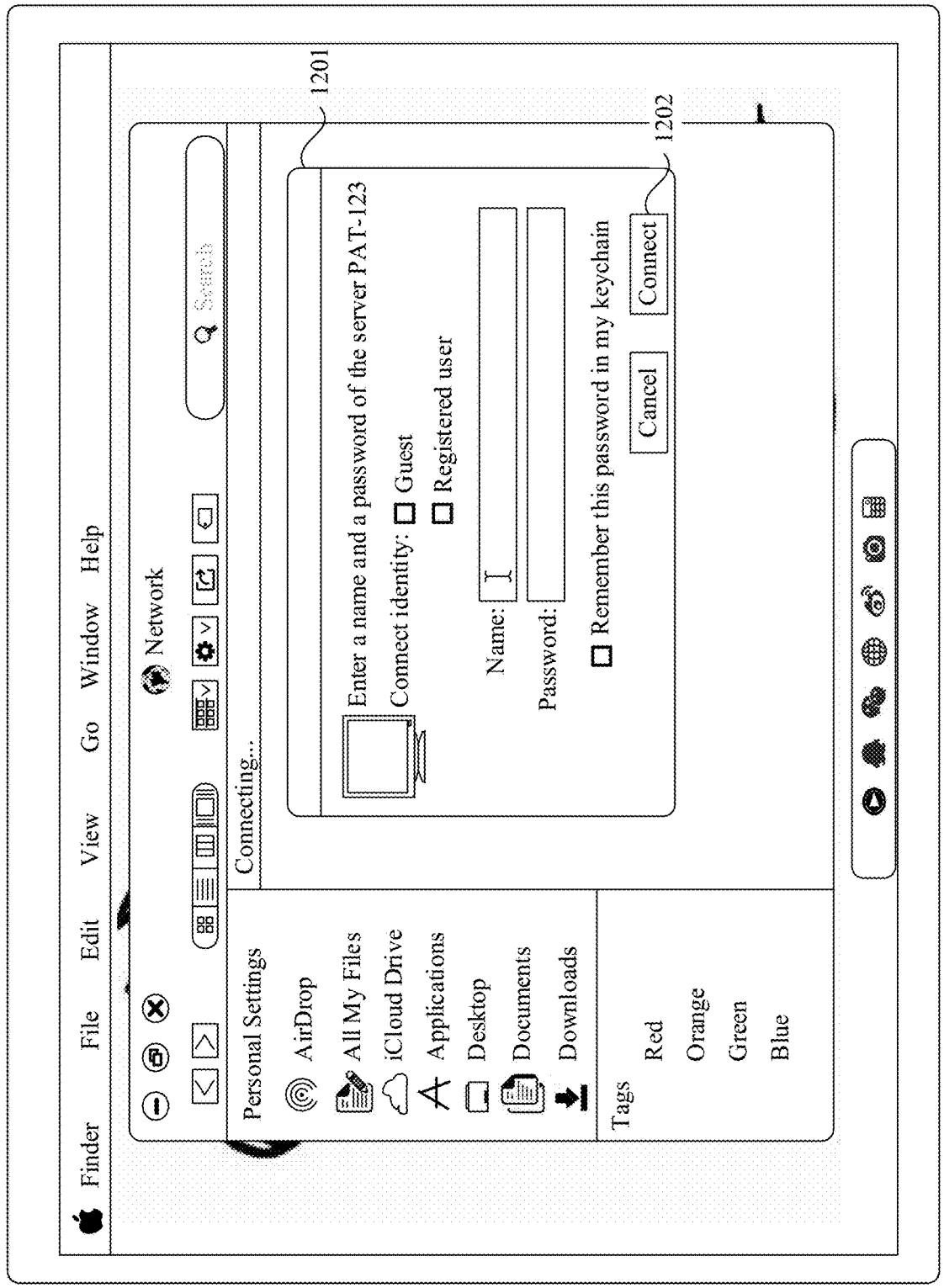
FIG. 12 is a schematic diagram of some other graphical user interfaces displayed on an electronic device according to some other embodiments of this application.

For example, with reference to FIG. 10, after the user performs a click operation on the identifier of the first electronic device on the first window 1001 shown in FIG. 10, in response to the user's click operation on the identifier of the first electronic device, the Mac notebook computer displays a second window 1201 shown in FIG. 12, where the second window 1201 may include a pop-up dialog box for the user to enter the user name and the password for login authentication. After the Mac notebook computer displays the pop-up dialog box, the user may enter the user name and the password in the pop-up dialog box, and click a Connect button 1202 after completing entering the user name and the password. In response to the user's click operation on the Connect button 1202, the Mac notebook computer adds, to access request information, the user name and the password that are entered by the user, and sends the access request information to the mobile phone by using the wireless access point.

Figure 13:
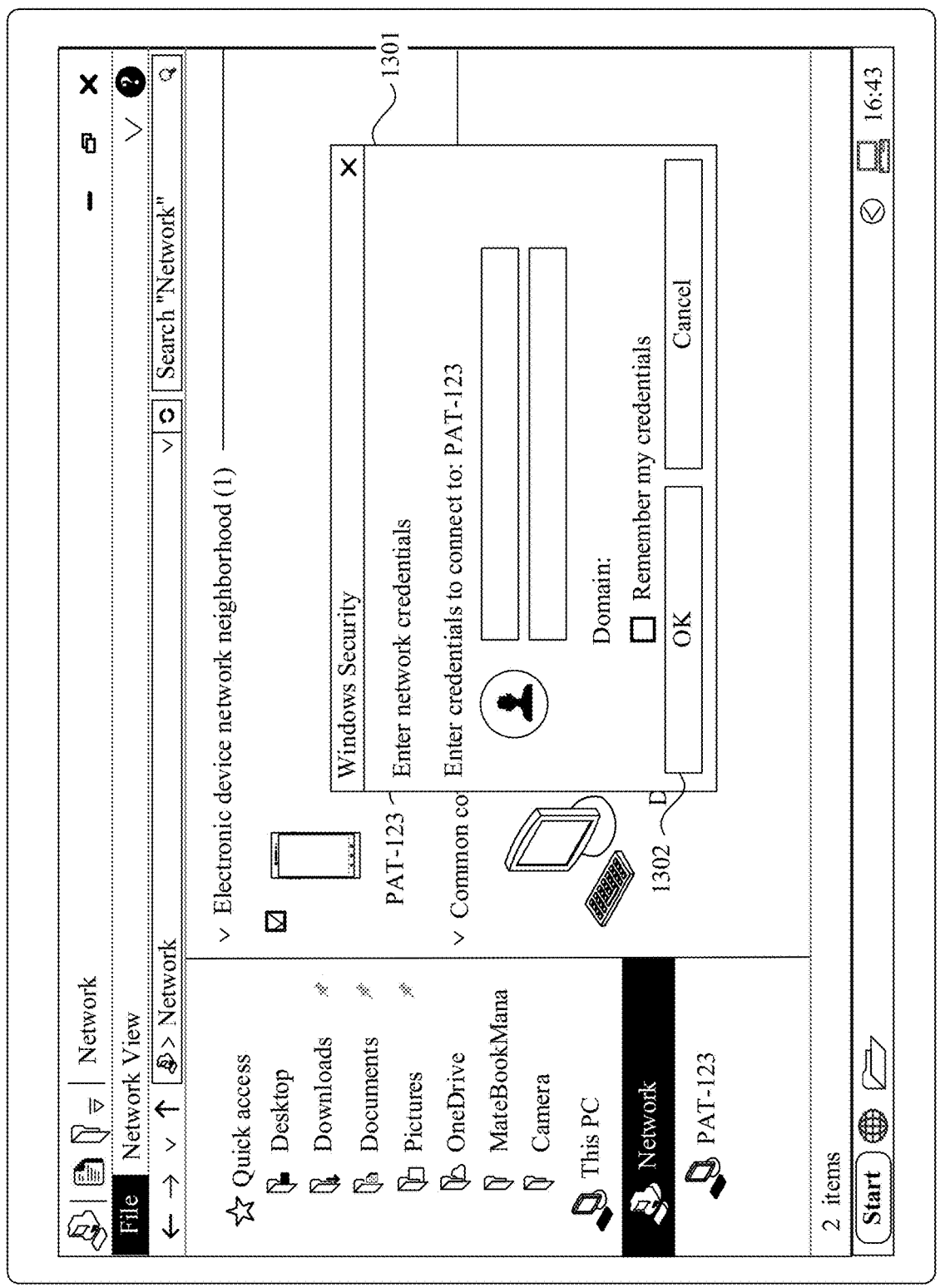
FIG. 13 is a schematic diagram of some other graphical user interfaces displayed on an electronic device according to some other embodiments of this application.

With reference to FIG. 11, after the user performs a click operation on the identifier of the first electronic device on the first window 1101 shown in FIG. 11, in response to the user's click operation on the identifier of the first electronic device, the Windows notebook computer displays a second window 1301 shown in FIG. 13, where the second window 1301 may include a pop-up dialog box for the user to enter the user name and the password for login authentication. After the Windows notebook computer displays the pop-up dialog box, the user may enter the user name and the password in the pop-up dialog box, and click an OK button 1302 after completing entering the user name and the password. In response to the user's click operation on the OK button 1302, the Windows notebook computer adds, to access request information, the user name and the password that are entered by the user, and sends the access request information to the mobile phone by using the wireless access point.

S408: The first electronic device receives the access request information of the second electronic device from a first port, and verifies validity of the user name and the password that are carried in the access request information.

The first port is a serving port for a local area network shared access protocol. For example, the local area network shared access protocol is the SMB protocol. The first port may be a port 139/445 for the TCP protocol.

After enabling the data sharing function, the first electronic device may listen on the first port, to learn in time whether there is another electronic device that needs to access the first electronic device. After the first electronic device receives, from the first port, the access request information of the second electronic device forwarded by using the wireless access point, the first electronic device may verify validity of the second electronic device based on the access request information. To be specific, the first electronic device may verify the user name and the password that are entered by the user and that are carried in the received access request information. For example, the validity verification operation may be performed by an application layer, or may be performed by a hardware abstraction layer.

S409: After the validity verification succeeds, the first electronic device sends access response information to the second electronic device, where the access response information carries a classified shared directory.

The first electronic device may send the access response information to the second electronic device by using the wireless access point, so that the shared data in the first electronic device is accessed from the second electronic device. The classified shared directory may include at least one of the following: an internal storage directory and a common file directory. The internal storage directory is a directory of all data stored in a memory of the first electronic device. In some embodiments of this application, the common file directory may be a directory of data that is stored in the memory of the first electronic device and that meets a specific condition. For example, the common file directory is a directory of data that is stored in the memory of the first electronic device and whose user's access frequency is greater than a threshold. In some other embodiments of this application, the common file directory may be a directory of specific data, for example, a video, a picture, or music, stored in the memory of the first electronic device. In addition, the common file directory can be mapped to a directory in which corresponding data is actually stored in the memory of the first electronic device. In some embodiments of this application, the classified shared directory may be dynamically updated. For example, an application framework layer may monitor the shared data in the mobile phone, and when detecting that the shared data in the mobile phone changes, the application framework layer notifies the hardware abstraction layer, so that the hardware abstraction layer updates the shared directory.

For example, the common file directory is a picture directory, to be specific, the classified shared directory includes the internal storage directory and an album directory. The classified shared directory may be shown in Table 1.

TABLE 1

| Mobile phone | Album | Camera | 1.jpg |
| | | | 2.jpg |
| | | | 3.jpg |
| | | WeChat | |
| | | Screen recording and screenshot | |
| | | Magazine unlock | |
| | | Bluetooth share | |
| | Internal storage | Android | Data |
| | | | 0bb |
| | | | obj |
| | | AnyMail | |
| | | AnyOffice | |
| | | . . . | |
| | | WLAN Direct | |

It can be learned from Table 1 that the classified shared directory includes the album directory and the internal storage directory. The album directory includes a camera subdirectory, a WeChat subdirectory, a magazine unlock subdirectory, and a Bluetooth share subdirectory. Each subdirectory includes one or more picture files. The internal storage directory includes an Android subdirectory, an AnyMail subdirectory, an AnyOffice subdirectory, a WLAN Direct subdirectory, and the like. Each subdirectory includes various types of data.

After the validity verification of the second electronic device succeeds, the first electronic device may send, to the second electronic device, the access response information that carries the classified shared directory, so that the user can access the shared data in the first electronic device by using the shared directory on the second electronic device.

Figure 14:
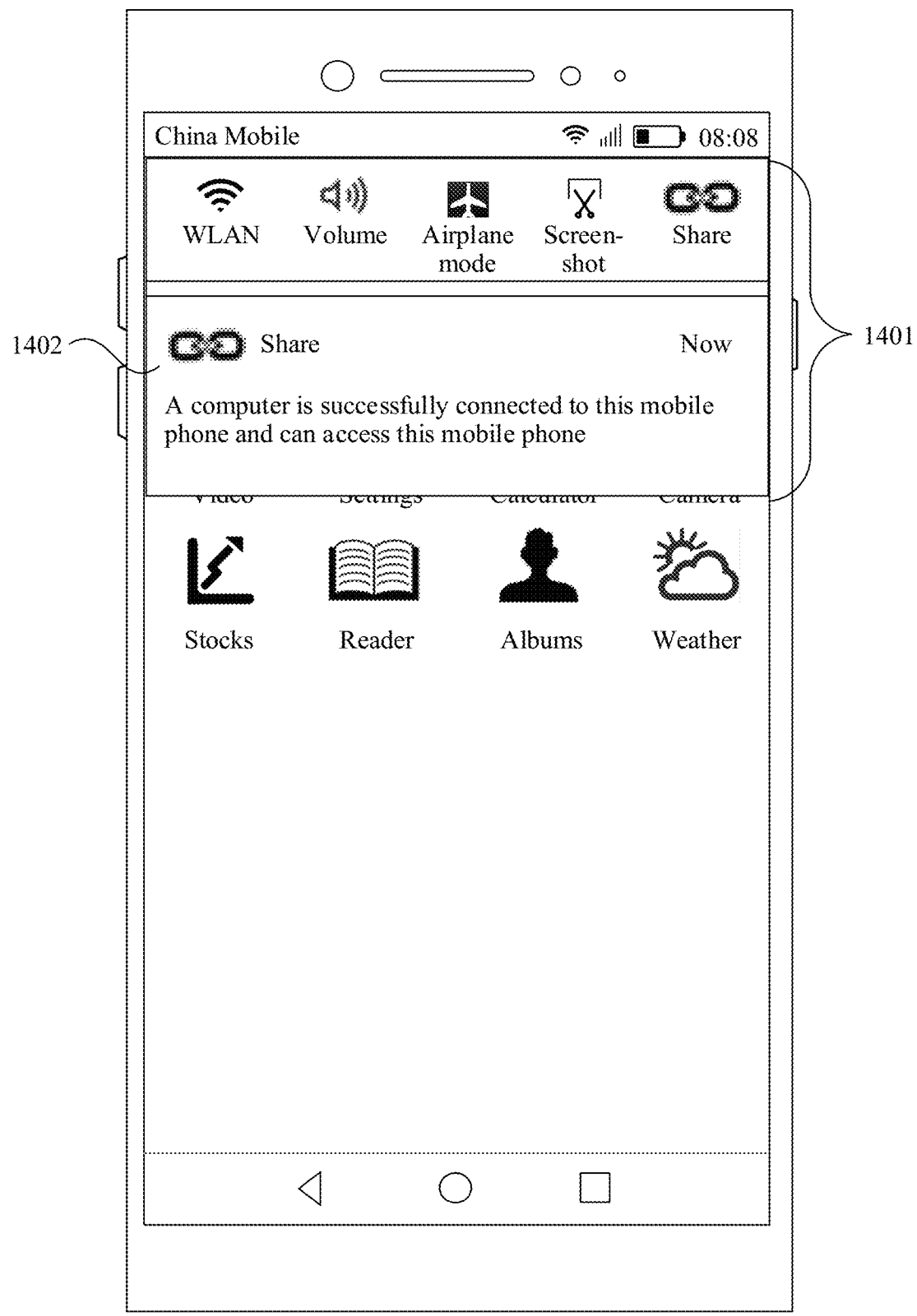
FIG. 14 is a schematic diagram of some other graphical user interfaces displayed on an electronic device according to some other embodiments of this application.

In some other embodiments of this application, after the validity verification performed by the first electronic device on the second electronic device succeeds, the first electronic device may further display a notification message, to notify the user that the device has successfully established a connection to the first electronic device, and the user can access the shared data in the first electronic device. For example, the hardware abstraction layer performs the validity verification. After the validity verification performed by the hardware abstraction layer on the second electronic device succeeds, the hardware abstraction layer may send, to the application framework layer, a notification message indicating that the electronic device has successfully established a connection to the mobile phone, and the electronic device can access the mobile phone. After receiving the notification message, the application framework layer forwards the notification message to the application layer. After receiving the notification message, the application layer may display, on a notification bar or a status bar displayed on a touchscreen of the mobile phone, the notification message indicating that the electronic device has successfully established a connection to the mobile phone, and the electronic device can access the mobile phone. For example, as shown in FIG. 14, the mobile phone may display a notification message 1402 on a notification bar 1401 displayed on the touchscreen of the mobile phone, to notify the user that the electronic device has successfully established a connection to the mobile phone, and the electronic device can access the mobile phone.

In some other embodiments of this application, when the first electronic device side allows password-free access, after the user performs the operation on the identifier of the first electronic device on the first window shown in FIG. 10 or FIG. 11, in response to the user's operation on the identifier of the first electronic device, the second electronic device may send the access request information to the first electronic device, to request to access the first electronic device.

S410: The second electronic device receives the access response information from the first electronic device.

S411: The second electronic device displays a third window based on the access response information, where the third window includes a folder corresponding to the classified shared directory.

After receiving the access response information from the first electronic device, the second electronic device may display, based on the access response information, the third window including the folder corresponding to the classified shared directory, and the user may perform an operation on the folder or data in the folder based on a requirement.

Figure 15:
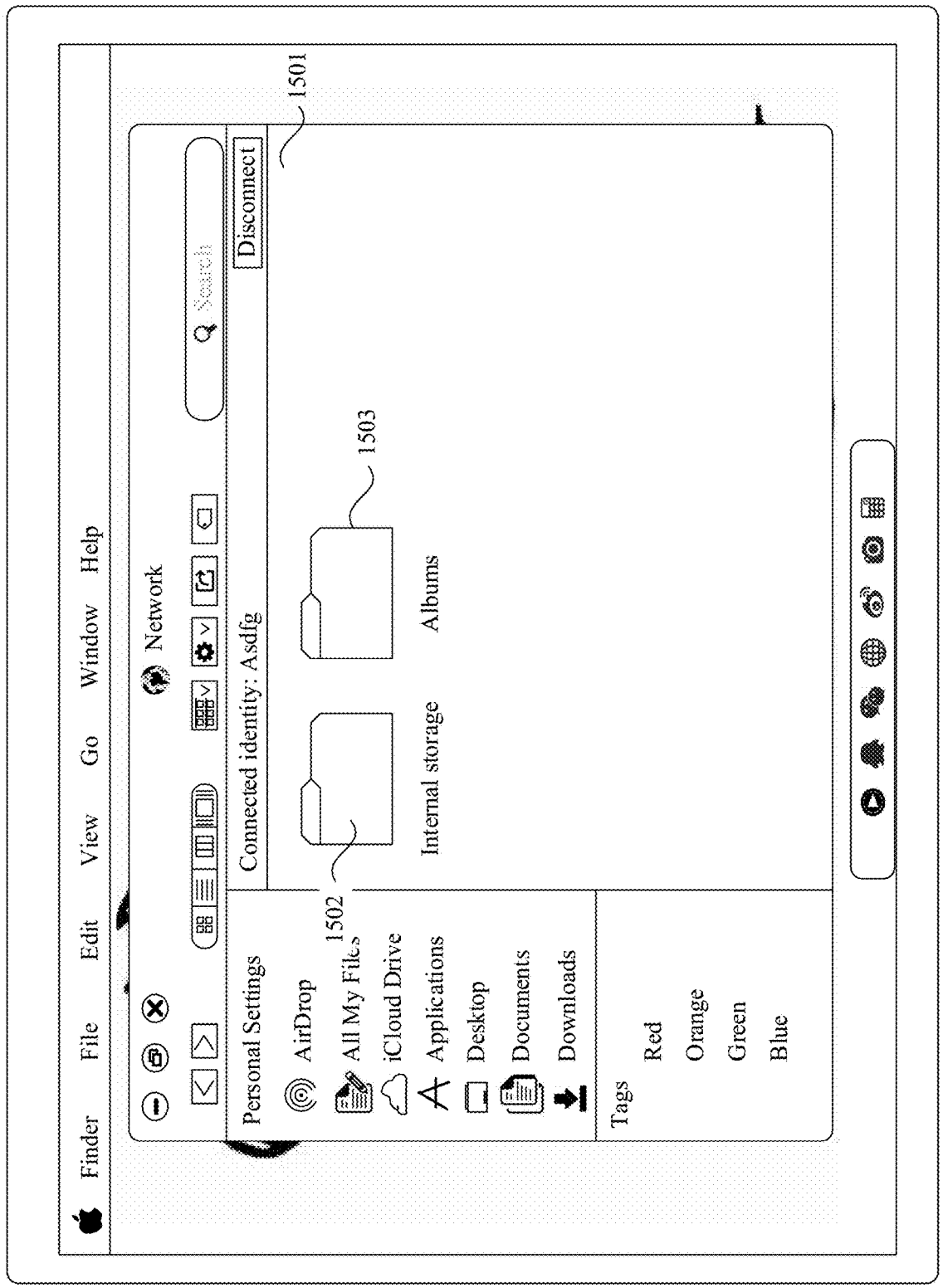
FIG. 15 is a schematic diagram of some other graphical user interfaces displayed on an electronic device according to some other embodiments of this application.

For example, with reference to the example in S409 and FIG. 12, as shown in FIG. 15, after receiving the access response information, the Mac notebook computer displays a third window 1501. The third window includes an internal storage folder 1502 and an album folder 1503. The internal storage folder 1502 corresponds to the internal storage directory, and the album folder 1503 corresponds to the album directory. After performing an operation on a folder, the user accesses a directory corresponding to the folder. This implements access to data stored in the first electronic device.

Figure 16:
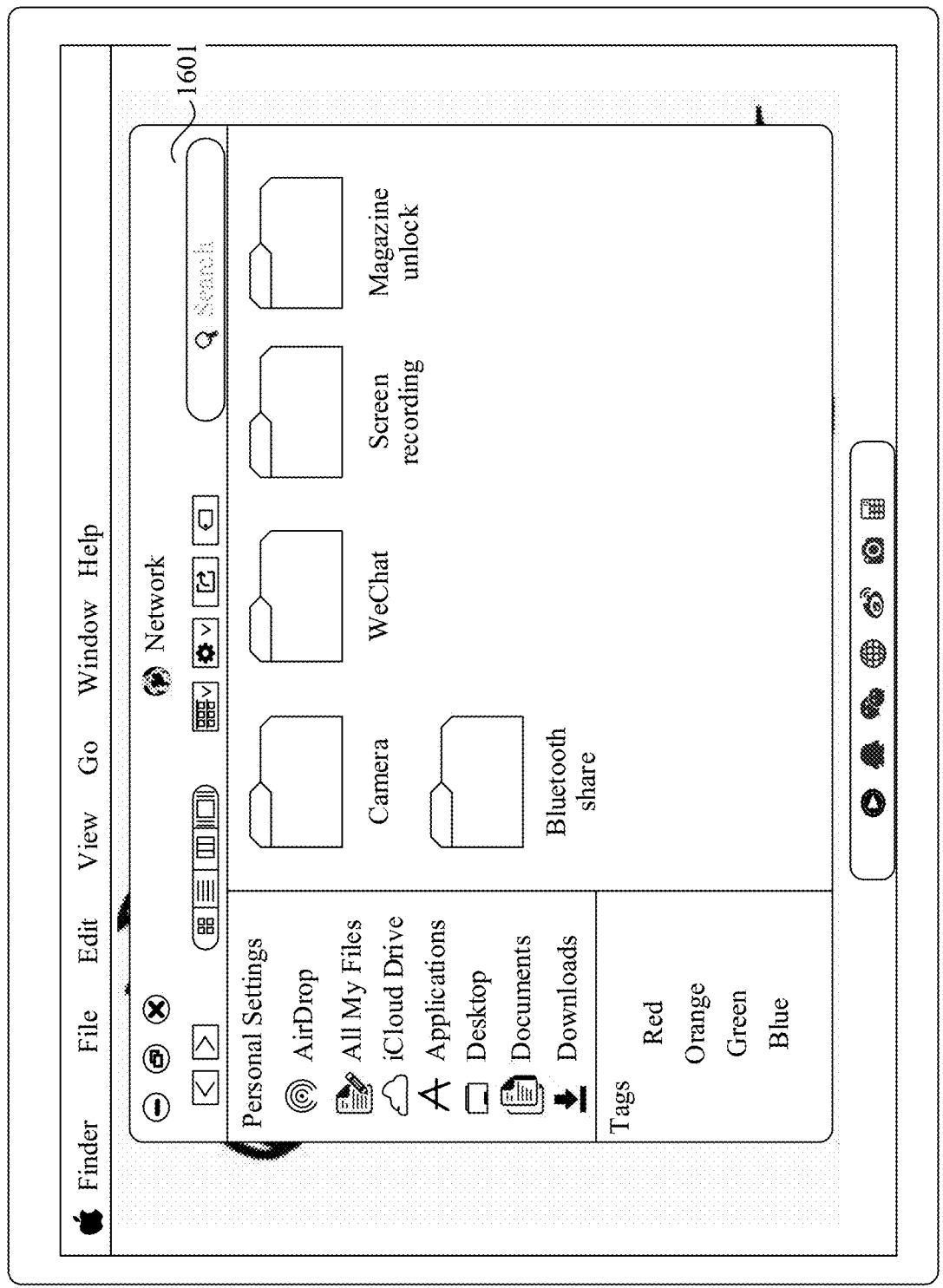
FIG. 16 is a schematic diagram of some other graphical user interfaces displayed on an electronic device according to some other embodiments of this application.
Figure 17:
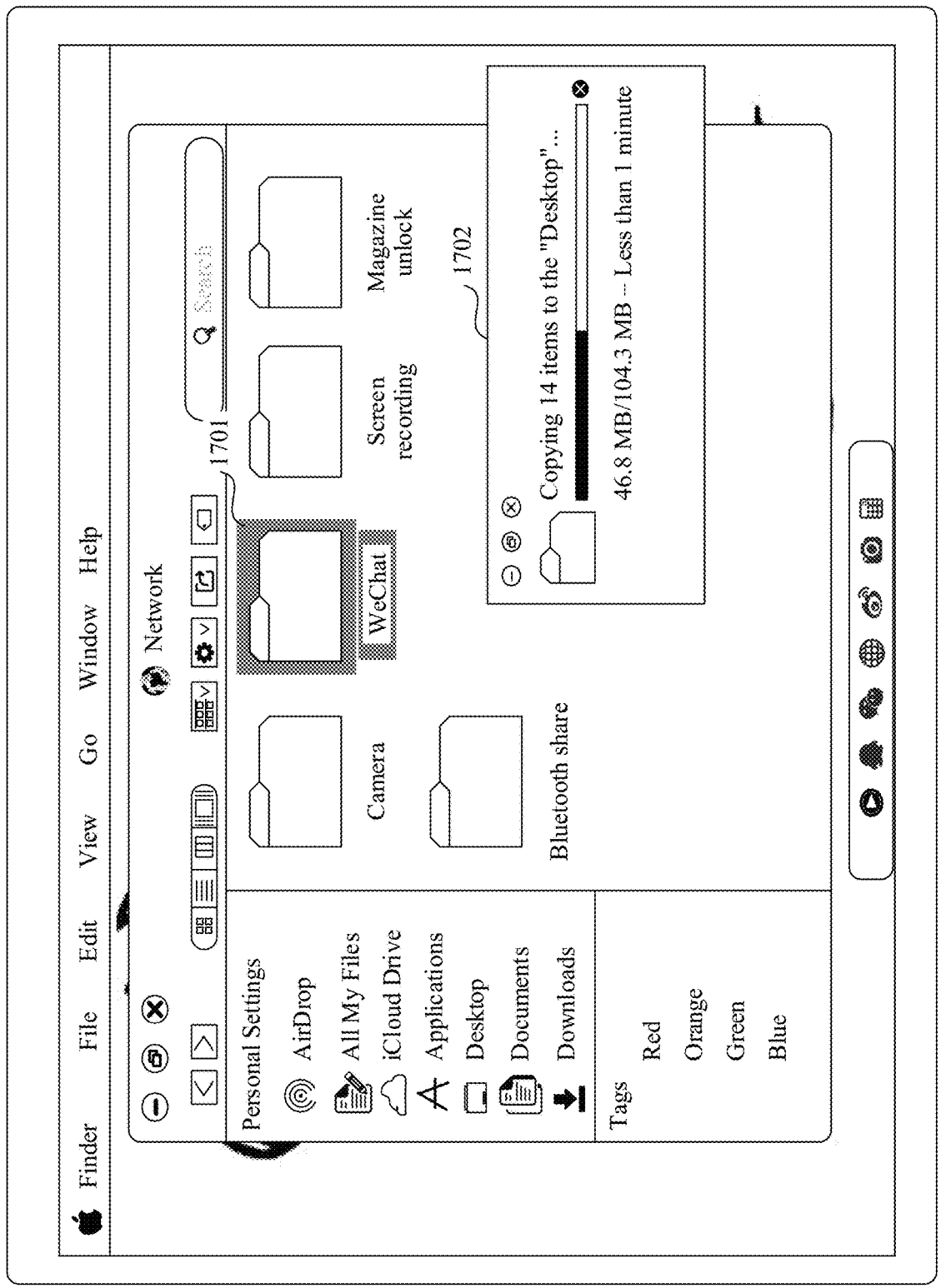
FIG. 17 is a schematic diagram of some other graphical user interfaces displayed on an electronic device according to some other embodiments of this application.

For example, the user performs a click operation on the album folder 1503 on the third window 1501. As shown in FIG. 16, in response to the user's click operation on the album folder 1503, the Mac notebook computer displays a window 1601. The window 1601 includes a camera folder, a WeChat folder, a magazine unlock folder, and a Bluetooth share folder. The camera folder, the WeChat folder, the magazine unlock folder, and the Bluetooth share folder respectively correspond to the camera subdirectory, the WeChat subdirectory, the magazine unlock subdirectory, and the Bluetooth share subdirectory. The user may perform an operation, such as copy, delete, or rename, on a folder or data in a folder displayed on the window 1601. For example, as shown in FIG. 17, the user may copy all data in the WeChat folder 1702 to the desktop of the Mac notebook computer, and the Mac notebook computer may display a pop-up window 1702, to indicate, to the user, progress of copying the data in the WeChat folder 1702 to the desktop of the Mac notebook computer. In addition, when the user performs an operation on the shared data in the first electronic device by using the second electronic device, the second electronic device may send a corresponding operation request to the first electronic device; and after receiving the operation request, the first electronic device may return a corresponding operation response, so that the second electronic device can correspondingly perform the operation on the shared data in the first electronic device based on the operation of the user.

In some other embodiments of this application, after the data sharing function of the first electronic device is enabled, the first electronic device may further dynamically monitor a status of the connection between the first electronic device and the wireless access point. If the first electronic device detects that the connection between the first electronic device and the wireless access point is disconnected, the first electronic device may automatically disable the data sharing function, thereby reducing power consumption of the first electronic device. In addition, the first electronic device may further display a notification message on the touchscreen of the first electronic device, to notify the user that the first electronic device has automatically disabled the data sharing function because the first electronic device is disconnected from the wireless access point.

In some other embodiments of this application, the first electronic device may further monitor a local area network switching event of the first electronic device. When detecting that the wireless connection between the first electronic device and the currently connected wireless access point is disconnected and that the first electronic device is connected to a new wireless access point, the first electronic device may also automatically disable the data sharing function of the first electronic device. This can effectively prevent unauthorized access to the first electronic device by another electronic device connected to the new wireless access point, especially when the first electronic device allows password-free access. In addition, the first electronic device may further display a notification message on the touchscreen of the first electronic device, to notify the user that the first electronic device has automatically disabled the data sharing function because the first electronic device is connected to the new wireless access point.

In some other embodiments of this application, after the user finishes accessing the shared data in the first electronic device from the second electronic device, the user may disable the data sharing function of the first electronic device. In this case, the application layer may detect a user's operation of disabling the data sharing function. The application layer converts the operation into a request for disabling the data sharing function, and transfers the request to the application framework layer. After receiving the request, the application framework layer invokes a service interface used for communication with the hardware abstraction layer, to transfer the request for disabling the data sharing function to the hardware abstraction layer. After receiving the request for disabling the data sharing function, the hardware abstraction layer disables the data sharing function of the mobile phone.

According to the method for sharing data in a local area network provided in this embodiment of this application, the first electronic device that supports the local area network shared access protocol receives an operation of enabling the data sharing function, and enables the data sharing function in response to the operation, where the data sharing function is mainly used for the user to access the shared data in the first electronic device from the second electronic device, and the second electronic device and the first electronic device are connected to a same local area network. In this way, there is no need to install any software on the first electronic device and the second electronic device, there is no need to connect the first electronic device and the second electronic device by using a USB cable, and the data stored in the first electronic device can be accessed quickly and conveniently from the second electronic device, provided that the first electronic device and the second electronic device are connected to the same local area network. In addition, both the Mac notebook computer of Apple and another Windows notebook computer support the local area network shared access protocol. Therefore, even if an operating system of the first electronic device, for example, the mobile phone, is incompatible with an operating system of a notebook computer, data stored in the mobile phone can be accessed from the notebook computer by using the method in this application.

It may be understood that, to implement the foregoing functions, the electronic device includes a corresponding hardware structure and/or software module for performing each function. A person skilled in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

An embodiment of this application further provides an electronic device for implementing the foregoing method embodiments. Specifically, the electronic device may be divided into functional modules. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example and is merely logical function division, and may be other division in an actual implementation.

Figure 18:
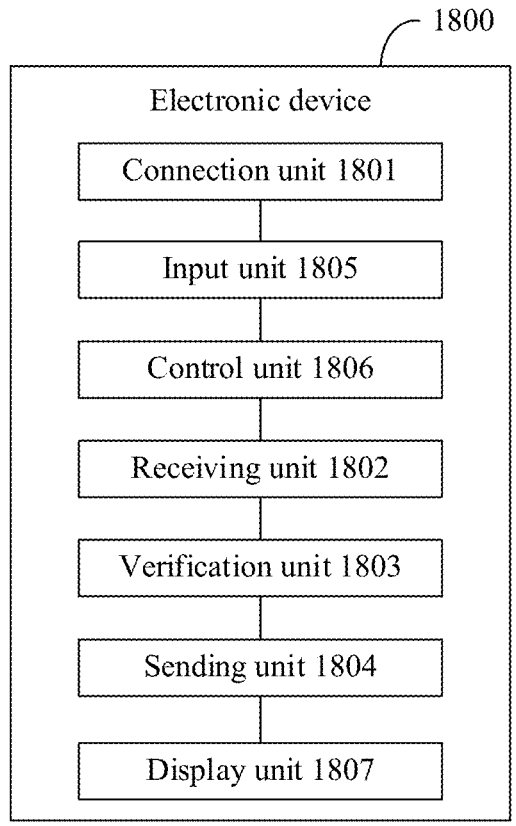
FIG. 18 is a schematic composition diagram of an electronic device according to an embodiment of this application.

When each functional module is obtained through division based on each corresponding function, FIG. 18 is an schematic structural diagram of an electronic device 1800 according to the foregoing embodiment. The electronic device 1800 may include a connection unit 1801, a receiving unit 1802, a verification unit 1803, and a sending unit 1804.

The connection unit 1801 is configured to support the electronic device to perform an operation of establishing a connection between the electronic device and a wireless access point in the foregoing method embodiment.

The receiving unit 1802 is configured to support the electronic device to perform S407 in the foregoing method embodiment and/or configured to perform another technical process described in this specification. An input unit may be a touchscreen, another hardware, or a combination of hardware and software.

The verification unit 1803 is configured to support the electronic device to perform S408 in the foregoing method embodiment and/or configured to perform another technical process described in this specification.

The sending unit 1804 is configured to support the electronic device to perform S409 in the foregoing method embodiment and/or configured to perform another technical process described in this specification.

Further, in this embodiment of this application, as shown in FIG. 18, the electronic device 1800 may further include an input unit 1805 and a control unit 1806.

The input unit 1805 is configured to receive input of a user on a display screen of the electronic device, for example, touch input, voice input, gesture input, or a floating operation, and the input unit 1805 is configured to support the electronic device to perform S401 in the foregoing method embodiment and/or configured to perform another technical process described in this specification. The input unit may be a touchscreen, another hardware, or a combination of hardware and software.

The control unit 1806 is configured to support the electronic device to perform S402 in the foregoing method embodiment and/or configured to perform another technical process described in this specification.

Further, in this embodiment of this application, as shown in FIG. 18, the electronic device 1800 may further include a display unit 1807.

The display unit 1807 is configured to support the electronic device to perform a displaying operation in the foregoing method embodiment and/or configured to perform another technical process described in this specification.

All related content of the operations in the foregoing method embodiment may be cited in function descriptions of the corresponding functional modules. Details are not described herein again.

Certainly, the electronic device includes but is not limited to the units and modules listed above. In addition, functions that can be specifically implemented by the functional units include but are not limited to functions corresponding to the method operations in the foregoing examples. For detailed descriptions of other units of the electronic device 1800, refer to the detailed descriptions of the method operations corresponding to the units. Details are not described again in this embodiment of this application.

Figure 19:
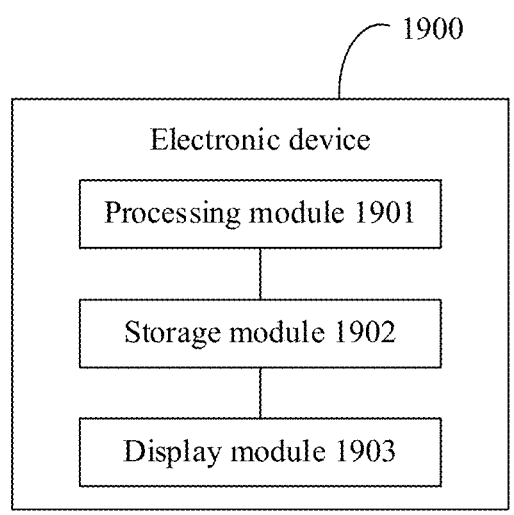
FIG. 19 is a schematic composition diagram of another electronic device according to an embodiment of this application.

When an integrated unit is used, FIG. 19 is an schematic structural diagram of an electronic device 1900 according to the foregoing embodiment. The electronic device 1900 includes a processing module 1901, a storage module 1902, and a display module 1903. The processing module 1901 is configured to control and manage an action of the electronic device 1900. The display module 1903 is configured to display content according to an instruction of the processing module 1901. The storage module 1902 is configured to store program code and data of the electronic device 1900. Further, the electronic device 1900 may further include an input module and a communications module. The communications module is configured to support the electronic device 1900 to communicate with another network entity, to implement functions of the electronic device such as calling, data exchange, and internet access.

The processing module 1901 may be a processor or a controller. The communications module may be a transceiver, an RF circuit, a communications interface, or the like. The storage module 1902 may be a memory. The display module may be a screen or a display. The input module may be a touchscreen, a voice input apparatus, a fingerprint sensor, or the like.

When the processing module 1901 is the processor, the communications module is the RF circuit, the storage module 1902 is the memory, and the display module 1903 is a touchscreen, the electronic device 1900 provided in this embodiment of this application may be the mobile phone shown in FIG. 2. The communications module may include not only the RF circuit, but also a Wi-Fi module, an NFC module, and a Bluetooth module. The communications modules such as the RF circuit, the NFC module, the Wi-Fi module, and the Bluetooth module may be collectively referred to as the communications interface. The processor, the RF circuit, the touchscreen, and the memory may be coupled together by using a bus.

An embodiment of this application further provides a computer storage medium. The computer storage medium stores computer program code, and when the foregoing processor executes the computer program code, the electronic device performs related method operations in any accompanying drawing of FIG. 4 or FIG. 9A and FIG. 9B to implement the supplementary service setting method in the foregoing embodiment.

An embodiment of this application further provides a computer program product. When the computer program product is run on a computer, the computer is enabled to perform related method operations in any accompanying drawing of FIG. 4 or FIG. 9A and FIG. 9B to implement the supplementary service setting method in the foregoing embodiment.

An embodiment of this application further provides a control device. The control device includes a processor and a memory. The memory is configured to store computer program code, and the computer program code includes a computer instruction. When the processor executes the computer instruction, the control device performs related method operations in any accompanying drawing of FIG. 4 or FIG. 9A and FIG. 9B to implement the supplementary service setting method in the foregoing embodiment. The control device may be an integrated circuit IC, or may be a system on chip SOC. The integrated circuit may be a universal integrated circuit, or may be a field programmable gate array FPGA, or may be an application-specific integrated circuit ASIC.

An embodiment of this application further provides a program orchestration apparatus. The apparatus has a function of implementing behavior of the electronic device in the foregoing method embodiment. The function may be implemented by hardware, or may be implemented by hardware executing corresponding software. The hardware or the software includes one or more modules corresponding to the foregoing function.

The electronic device, the computer storage medium, the computer program product, or the control device provided in the embodiments of this application is configured to perform the corresponding method described above. Therefore, for beneficial effects that can be achieved, refer to the beneficial effects of the corresponding method described above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the module or unit is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method of sharing data in a local area network, wherein the method comprises:
   establishing, by a first electronic device, a wireless connection to a wireless fidelity (Wi-Fi) hotspot;
      establishing, by a second electronic device, a wireless connection to the Wi-Fi hotspot; receiving, by the second electronic device, second input;
   displaying an identifier of the first electronic device on the second electronic device in response to receiving the second input, wherein the identifier of the first electronic device comprises a device icon and a to-be-discovered share name;
   receiving, by the second electronic device, third input;
   displaying a verification window on the second electronic device in response to receiving the third input, wherein the verification window prompts a user to enter a user name and a password for login authentication;
   in response to receiving input confirmation, adding, by the second electronic device to access request information, the user name and the password that are entered by the user for login authentication, and sending the access request information to the first electronic device using the Wi-Fi hotspot;
   receiving, by the first electronic device, the access request information from a first port, wherein the first port is a serving port for a server message block (SMB) protocol;
   verifying, by the first electronic device, validity of the second electronic device based on the access request information; and
   sending, by the first electronic device, access response information to the second electronic device using the Wi-Fi hotspot when the first electronic device determines that the validity of the second electronic device is successfully verified, so that shared data in the first electronic device is accessed from the second electronic device, wherein the access response information comprises an internal storage directory and a common file directory.

2. The method according to claim 1, wherein before the receiving, by the second electronic device, second input, the method further comprises:
   obtaining, by the first electronic device, a second user identifier of the second electronic device;
   determining, by the first electronic device, whether the second user identifier is the same as a first user identifier stored in the first electronic device;
   when the first electronic device determines that the second user identifier is the same as the first user identifier, automatically enabling, by the first electronic device, a data sharing function; and displaying, by the second electronic device, notification information, wherein the notification information indicates that the first electronic device has enabled the data sharing function.

3. The method according to claim 1, wherein before the receiving, by the second electronic device, second input, the method further comprises:
receiving, by the first electronic device, first input; and
enabling, by the first electronic device, a data sharing function in response to the first input.

4. The method according to claim 1, wherein the identifier of the first electronic device and an identifier of a third electronic device are comprised in different directories in a network neighborhood of the second electronic device, and the third electronic device is a computer that has enabled a data sharing function.

5. The method according to claim 1, wherein
the first port is a transmission control protocol TCP port 139 or 445.

6. A system for sharing data in a local area network, wherein the system comprises:
a first electronic device, which is a mobile phone; and a second electronic device;
wherein the first electronic device and the second electronic device are connected to a same wireless access point;
wherein the first electronic device receives, from a first port, access request information of the second electronic device forwarded using the wireless access point, wherein the first port is a serving port for a local area network shared access protocol;
wherein the first electronic device verifies validity of the second electronic device based on the access request information; wherein the first electronic device determines that the validity of the second electronic device is successfully verified, the first electronic device sends access response information to the second electronic device using the wireless access point, so that shared data in the first electronic device is accessed from the second electronic device, wherein the access response information comprises an internal storage directory and a common file directory;
wherein the second electronic device receives second input, and displays an identifier of the first electronic device on the second electronic device in response to receiving the second input, wherein the identifier of the first electronic device comprises a device icon and a to-be-discovered share name;
wherein the second electronic device receives third input, and displays a verification window on the second electronic device in response to receiving the third input, wherein the verification window prompts a user to enter a user name and a password for login authentication; and
wherein in response to receiving input confirmation, the second electronic device adds, to the access request information, the user name and the password that are entered by the user for login authentication, and sends the access request information to the first electronic device using a wireless fidelity (Wi-Fi) hotspot.

7. The system according to claim 6, wherein the identifier of the first electronic device and an identifier of a third electronic device are comprised in different directories in a network neighborhood of the second electronic device, and the third electronic device is a computer that has enabled a data sharing function.

8. A method of sharing data in a local area network, wherein the method comprises:
establishing, by a second electronic device, a wireless connection to a wireless hotspot;
establishing, by a first electronic device, a wireless connection to the Wi-Fi hotspot; obtaining, by the first electronic device, a second user identifier of the second electronic device;
determining, by the first electronic device, whether the second user identifier is the same as a first user identifier stored in the first electronic device;
if the first electronic device determines that the second user identifier is the same as the first user identifier, automatically enabling, by the first electronic device, a data sharing function;
displaying, by the second electronic device, notification information, wherein the notification information indicates that the first electronic device has enabled the data sharing function;
receiving, by the second electronic device, second input;
displaying an identifier of the first electronic device on the second electronic device in response to receiving the second input, wherein the identifier of the first electronic device comprises a device icon and a to-be-discovered share name;
receiving, by the second electronic device, third input;
displaying a verification window on the second electronic device in response to receiving the third input, wherein the verification window is used to prompt a user to enter a user name and a password for login authentication;
after receiving input confirmation, adding, by the second electronic device to access request information, the user name and the password that are entered by the user for login authentication, and sending the access request information to the first electronic device using the Wi-Fi hotspot;
receiving, by the first electronic device, the access request information from a first port, wherein the first port is a serving port for a server message block (SMB) protocol;
verifying, by the first electronic device, validity of the second electronic device based on the access request information; and
when the first electronic device determines that the validity of the second electronic device is successfully verified, sending, by the first electronic device, access response information to the second electronic device using the Wi-Fi hotspot, so that shared data in the first electronic device is accessed from the second electronic device, wherein the access response information comprises an internal storage directory and a common file directory.

9. A first electronic device, comprising:
a touchscreen;
one or more processors; and
a memory for storing instructions which, when executed by the one or more processors, cause the first electronic device to:
establish a wireless connection to a wireless access point, wherein the wireless access point is a wireless fidelity Wi-Fi hotspot or Bluetooth beacon;
receive, from a first port, access request information of a second electronic device forwarded using the wireless access point, wherein the first port is a serving port for a local area network sharing access protocol, and the second electronic device establishes a wireless connection to the wireless access point, wherein a local area network file sharing protocol is a server message block (SMB) protocol;
verify validity of the second electronic device based on the access request information; and
when determining that the validity of the second electronic device is successfully verified, send access response information to the second electronic device using the wireless access point, so that shared data in the first electronic device is accessed from the second electronic device, wherein the access response information comprises an internal storage directory and a common file directory.

10. The first electronic device according to claim 9, wherein the
first electronic device is further caused to:
receive first input from an input unit; and
enable a data sharing function in response to the first input received by the input unit.

11. The first electronic device according to claim 10, wherein the
first electronic device is further caused to:
display a share control screen, wherein the share control screen comprises a share on/off button; and
receive the first input for the share on/off button.

12. The first electronic device according to claim 9, wherein the first port is a transmission control protocol TCP port 139 or 445.

13. The first electronic device according to claim 9, wherein the electronic device is further caused to:
display prompt information when it is determined that the wireless connection between the first electronic device and the wireless access point is disconnected and that a wireless connection is established from the electronic device and another wireless access point, wherein the prompt information indicates that the first electronic device establishes the wireless connection to the another wireless access point.

* * * * *

UNITED STATES PATENT AND TRADEMARK OFFICE
CERTIFICATE OF CORRECTION

PATENT NO. : 11,196,798 B2
APPLICATION NO. : 17/041832
DATED : December 7, 2021
INVENTOR(S) : Jiaxin Li et al.

It is certified that error appears in the above-identified patent and that said Letters Patent is hereby corrected as shown below:

In the Claims

Claim 6, Column 33, Line 35, delete "wherein the first electronic device" and insert --wherein when the first electronic device--.

Claim 8, Column 34, Line 4, delete "connection to a wireless hotspot;" and insert --connection to a wireless fidelity (Wi-Fi) hotspot;--.

Claim 9, Column 34, Line 63, delete "hotspot or Bluetooth beacon;" and insert --hotspot or a Bluetooth beacon;--.

Claim 13, Column 36, Line 11, delete "wherein the electronic device" and insert --wherein the first electronic device--.

Claim 13, Column 36, Line 15, delete "from the electronic" and insert --from the first electronic--.

Signed and Sealed this
Nineteenth Day of April, 2022

Katherine Kelly Vidal
*Director of the United States Patent and Trademark Office*